US009923832B2

(12) United States Patent
Wetterwald et al.

(10) Patent No.: US 9,923,832 B2
(45) Date of Patent: Mar. 20, 2018

(54) LIGHTWEIGHT FLOW REPORTING IN CONSTRAINED NETWORKS

(71) Applicant: Cisco Technology, Inc., San Jose, CA (US)

(72) Inventors: Patrick Wetterwald, Mouans Sartoux (FR); Pascal Thubert, La Colle sur Loup (FR); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 381 days.

(21) Appl. No.: 14/336,175

(22) Filed: Jul. 21, 2014

(65) Prior Publication Data
US 2016/0021014 A1  Jan. 21, 2016

(51) Int. Cl.
*H04L 12/851* (2013.01)
*H04L 12/813* (2013.01)
*H04W 40/02* (2009.01)
*H04L 12/753* (2013.01)

(52) U.S. Cl.
CPC .......... *H04L 47/2441* (2013.01); *H04L 45/48* (2013.01); *H04L 47/20* (2013.01); *H04L 47/2483* (2013.01); *H04W 40/02* (2013.01)

(58) Field of Classification Search
CPC ..... H04L 47/2441; H04L 45/48; H04L 47/20; H04L 47/2483; H04W 40/02
See application file for complete search history.

(56) References Cited

U.S. PATENT DOCUMENTS

| | | | | |
|---|---|---|---|---|
| 6,894,972 B1 * | 5/2005 | Phaal | ................... | H04L 43/022 370/229 |
| 7,599,302 B2 * | 10/2009 | Vasseur | ............... | H04L 41/5022 370/248 |
| 7,706,267 B2 * | 4/2010 | Ford | ................... | H04L 63/0236 370/230 |
| 8,619,614 B2 | 12/2013 | Narayanaswamy et al. | | |
| 9,276,716 B2 * | 3/2016 | Wetterwald | ........... | H04L 5/0037 |
| 9,319,962 B2 * | 4/2016 | Wetterwald | ........... | H04W 40/04 |
| 9,705,737 B2 * | 7/2017 | Wetterwald | ......... | H04L 41/0803 |
| 2012/0072612 A1 | 3/2012 | Flinta et al. | | |
| 2012/0173702 A1 | 7/2012 | Szabo et al. | | |
| 2012/0207467 A1 * | 8/2012 | Lee | ..................... | H04J 14/0257 398/16 |
| 2012/0287793 A1 * | 11/2012 | Monk | ..................... | H04L 43/18 370/241 |

(Continued)

OTHER PUBLICATIONS

Dave Plonka,FlowScan: A Network Traffic Flow Reporting and Visualization Tool, Sep. 2000, University of Wisconsin-Madison, pp. 305-317 of the Proceedings.*

(Continued)

*Primary Examiner* — Mounir Moutaouakil
(74) *Attorney, Agent, or Firm* — Parker Ibrahim & Berg LLC; James M. Behmke; Stephen D. LeBarron

(57) ABSTRACT

In one embodiment, a device in a network receives one or more packets that are part of a traffic flow. The device provides a sample packet to a path computation element (PCE) that includes a signature that uniquely identifies the traffic flow. The device receives a traffic flow policy for the traffic flow from a policy engine and enforces the traffic flow policy for the traffic flow.

28 Claims, 22 Drawing Sheets

(56) References Cited

U.S. PATENT DOCUMENTS

2014/0328587 A1* 11/2014 Magri ................ H04Q 11/0066
398/26
2015/0026794 A1* 1/2015 Zuk .................... H04L 63/0227
726/13
2015/0171989 A1* 6/2015 Wang ...................... H04L 45/42
398/49

OTHER PUBLICATIONS

Jean-Philippe Vasseur, L'architecture Path Computation Element (PCE) pour les réseaux MPLS et son application à L'internet des objets, Jan. 23, 2013, 168 pages, Doctorat Thesis.*
D. Dujovne et al., "6TiSCH on-the-fly scheduling", Internet Draft, http://tools.ietf.org/html/draft-dujovne-6tisch-on-the-fly-02, pp. 1-10 (2014).
P. Thubert et al., "An Architecture for IPv6 over the TSCH mode of IEEE 802.15 4e", Internet Draft—http://tools.ietf.org/html/draft-ietf-6tisch-architecture-03, pp. 1-30 (2014).
X. Vilajosana et al., "Minimal 6TiSCH Configuration", draft-ietf-6tisch-minimal-02, Internet Draft, pp. 1-20 (2014).
MR. Palattella et al., "Terminology in IPv6 over the TSCH mode of IEEE 802.15 4e", Internet Draft—draft-ietf-6tisch-terminology-02, pp. 1.12 (2014).
T Watteyne et al., "Using IEEE802.4e TSCH in an LLN context: Overview, Problem Statement and Goals", Internet Draft—draft-ietf-6tisch-tsch-01, pp. 1-22 (Jul. 4, 2014).
S. Deering et al., "Internet Protocol, Version 6 (IPv6)—Specification", file:///C:/Users/kheywood/AppData/Local/Temp/Low/DZCVP316.htm, pp. 1-39 (Dec. 1998).

* cited by examiner

LIGHTWEIGHT FLOW REPORTING IN CONSTRAINED NETWORKS

TECHNICAL FIELD

The present disclosure relates generally to computer networks, and, more particularly, to a lightweight flow reporting mechanism.

BACKGROUND

In general, deterministic networking attempts to precisely control when a data packet arrives at its destination (e.g., within a bounded timeframe). This category of networking may be used for a myriad of applications such as industrial automation, vehicle control systems, and other systems that require the precise delivery of control commands to a controlled device. However, implementing deterministic networking also places additional requirements on a network. For example, packet delivery in a deterministic network may require the network to exhibit fixed latency, zero or near-zero jitter, and high packet delivery ratios.

As an example of a deterministic network, consider a railway system. A railway system can be seen as deterministic because trains are scheduled to leave a railway station at certain times, to traverse any number stations along a track at very precise times, and to arrive at a destination station at an expected time. From the human perspective, this is also done with virtually no jitter. Which tracks are used by the different trains may also be selected so as to prevent collisions and to avoid one train from blocking the path of another train and delaying the blocked train.

Low power and lossy networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. Changing environmental conditions may also affect device communications in an LLN. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
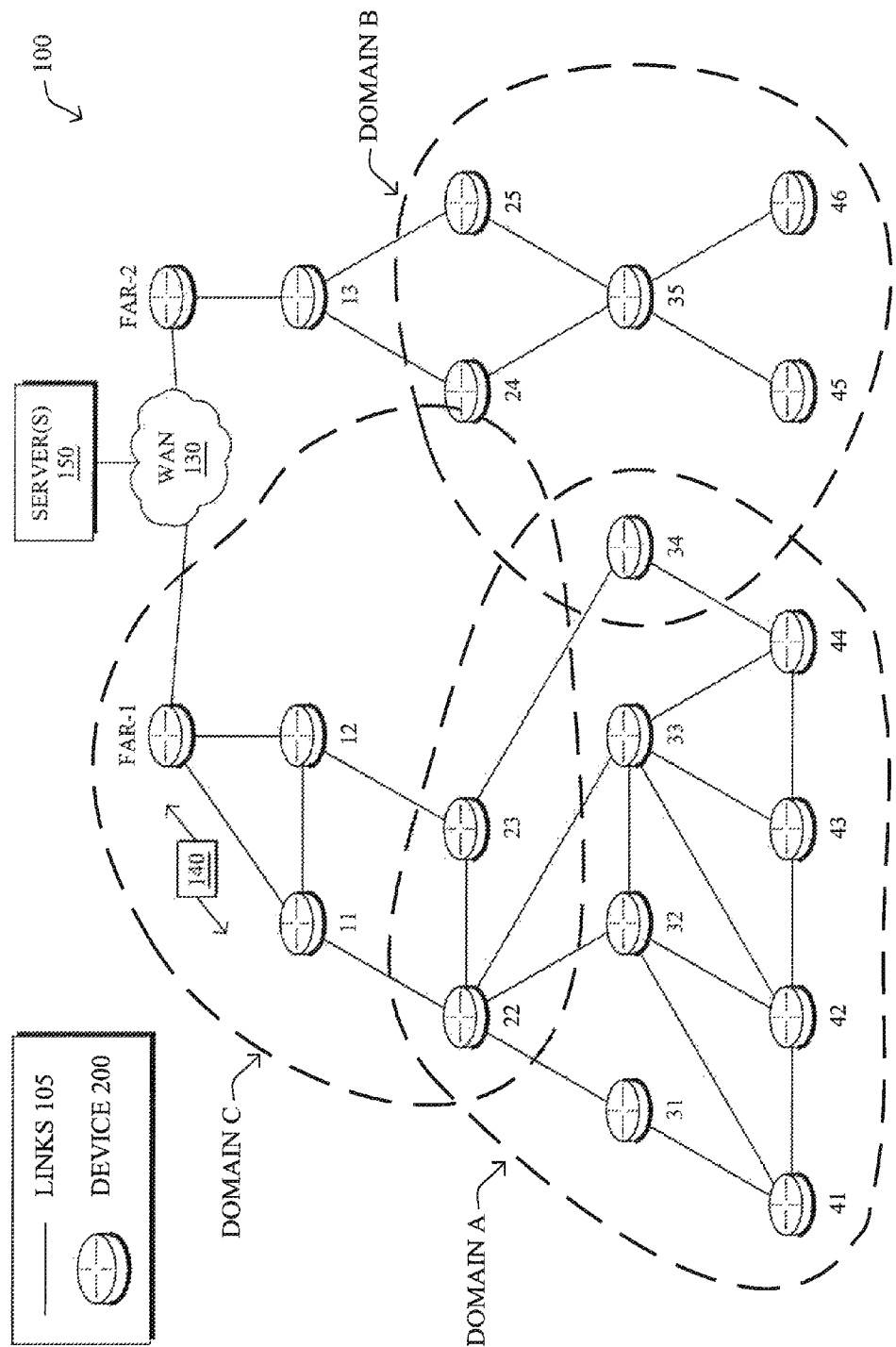
FIG. 1 illustrates an example communication network.

According to one or more embodiments of the disclosure, a device in a network receives one or more packets that are part of a traffic flow. The device provides a sample packet to a path computation element (PCE) that includes a signature that uniquely identifies the traffic flow. The device receives a traffic flow policy for the traffic flow from a policy engine and enforces the traffic flow policy for the traffic flow.

In further embodiments, a device in a network generates a flow signature for a particular traffic flow and a flow description for the traffic flow. The device inserts the flow signature and description into a header of a packet belonging to the traffic flow. The device sends the packet to another device in the network.

In additional embodiments, a device receives a sample packet that is part of a traffic flow in a network. The device inspects the sample packet to identify properties of the traffic flow and generates flow data based on the identified properties of the traffic flow. The device provides the flow data to a network traffic policy engine.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "FAR-1," "FAR-2," and "11," "12," . . . "46," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while network 100 is shown in a certain orientation, particularly with a field area router (FAR) node, the network 100 is merely an example illustration that is not meant to limit the disclosure. Also as shown, a particular FAR (e.g., FAR-1) may communicate via a WAN 130 with any number of servers 150, such as a path computation element (PCE), network management service (NMS), or other supervisory device.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other. One communication technique that may be used to implement links 105 is channel-hopping. Also known as frequency hopping, use of such a technique generally entails wireless devices "hopping" (e.g., alternating) between different transmission and reception frequencies according to a known schedule. Network 100 may also be divided into any number of wireless domains (e.g., domains A-C) in which nodes 200 may communicate.

Figure 2:
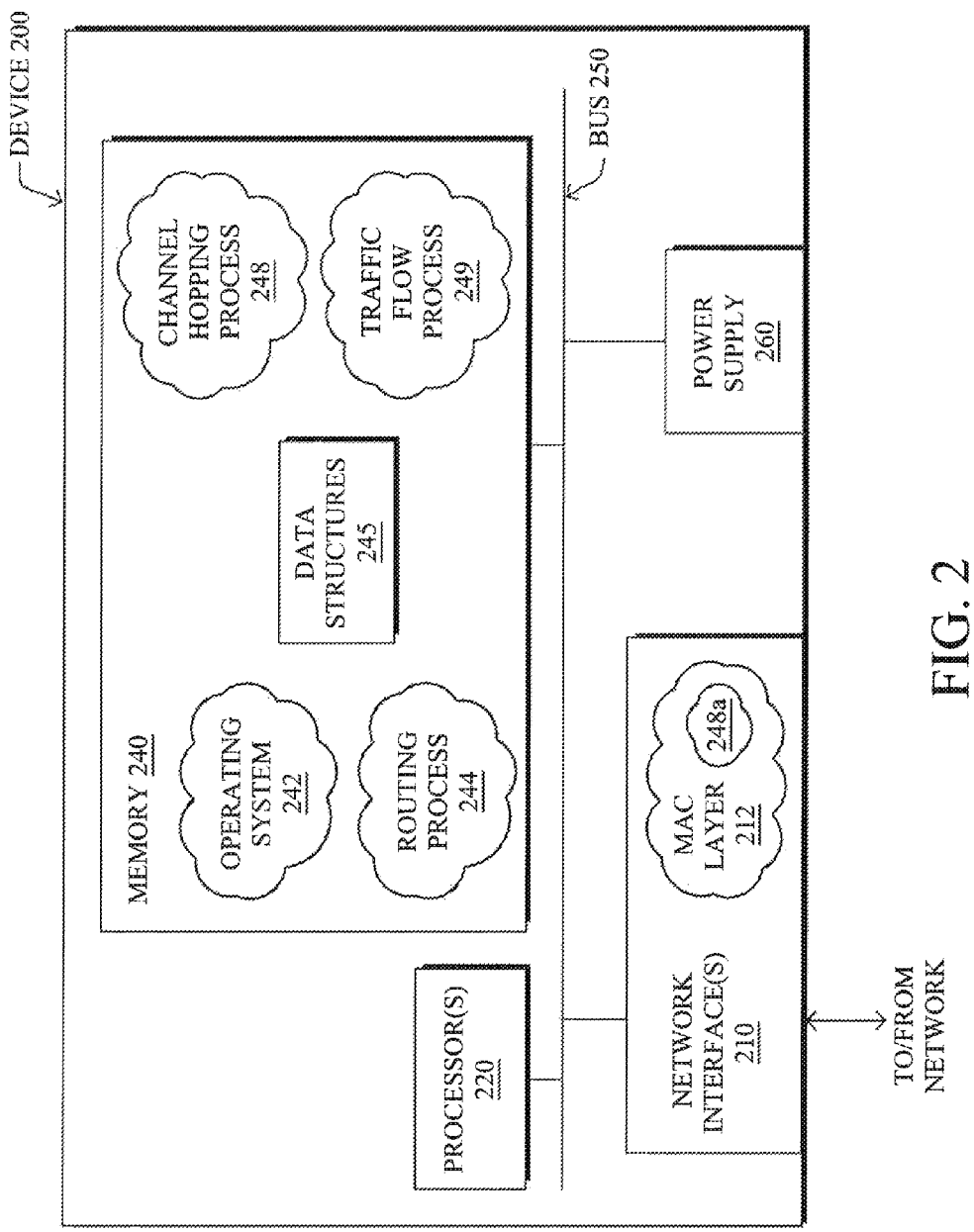
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210, e.g., transceivers, include the mechanical, electrical, and signaling circuitry for communicating data over links 105 coupled to the network 100. The network interfaces may be configured to transmit and/or receive data using a variety of different communication protocols, particularly for frequency-hopping communication as described herein. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 includes a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may include hardware elements or hardware logic configured to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may include routing process/services 244, a traffic flow process 249, and an illustrative channel hopping process 248 as described in greater detail below. Note that while channel hopping process 248 is shown in centralized memory 240, alternative embodiments provide for the process to be specifically operated within the network interfaces 210, such as within a MAC layer 212 (as "process 248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

According to various embodiments, routing process 244, traffic flow process 249, and/or channel hopping process 248/248a may utilize machine learning techniques, to predict a future state of the network (e.g., predict routing changes, predict time slot usage by nodes, etc.). In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more machine learning processes for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Artificial Neural Networks (ANNs) are a type of machine learning technique whose underlying mathematical models that were developed inspired by the hypothesis that mental activity consists primarily of electrochemical activity between interconnected neurons. ANNs are sets of computational units (neurons) connected by directed weighted links. By combining the operations performed by neurons and the weights applied by, ANNs are able to perform highly non-linear operations to input data. The interesting aspect of ANNs, though, is not that they can produce highly non-linear outputs of the input, but that they can learn to reproduce a predefined behavior through a training process. Accordingly, an ANN may be trained to identify deviations in the behavior of a network that could indicate the presence of a network attack (e.g., a change in packet losses, link, delays, number of requests, etc.).

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A. "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012). Further, an example OF (e.g., a default OF) may be found in an IETF RFC, entitled "RPL Objective Function 0"<RFC 6552> by Thubert (March 2012) and "The Minimum Rank Objective Function with Hysteresis"<RFC 6719> by O. Gnawali et al. (September 2012).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO) message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
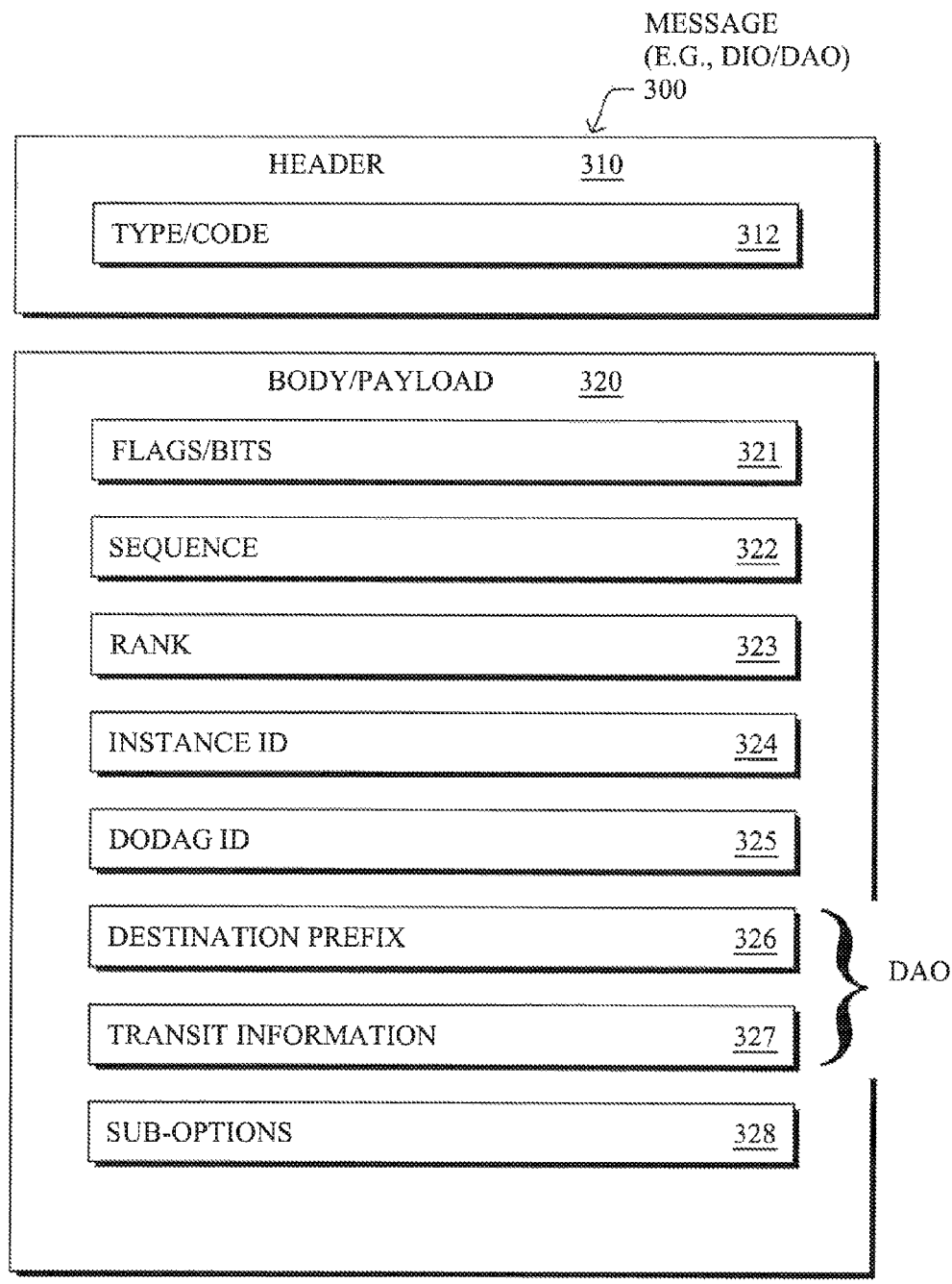
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
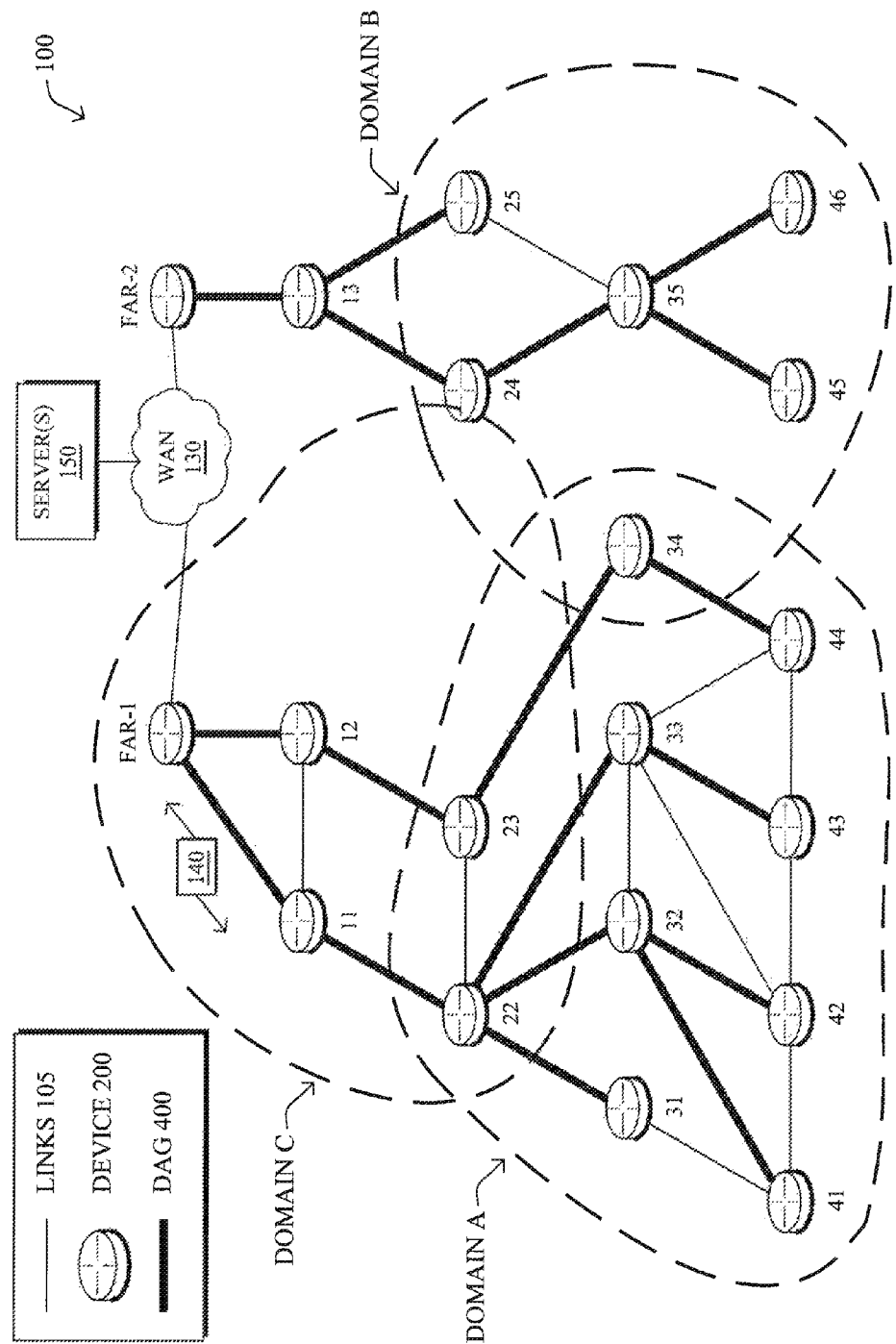
FIG. 4 illustrates an example directed acyclic graph (DAG) in the communication network of FIG. 1.

FIG. 4 illustrates an example simplified DAG 400 that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

According to various embodiments, communications within network 100 may be deterministic. Notably, low power wireless industrial process control typically uses 1 Hz to 4 Hz control loops, and for those, a scheduled MAC protocol can be considered deterministic, even when clocks drift in the order of tens of parts per million (ppm). A low-throughput technology such as IEEE802.15.4 may thus be adapted to support determinism. In particular, the bandwidth can be pre-formatted in a time division multiplexing (TDM) fashion using IEEE802.15.4, and time slots become a unit of throughput that can allocated to a deterministic flow, without incurring a huge consumption of system resources. In other implementations of a time sensitive network, individual timers may be used by the networked devices instead of TDM. Such timers may elapse at the time of a deterministic transmission, so as to reserve the medium for that transmission, leaving the medium free for best effort routing the rest of the time.

Routing in a deterministic network can be operated either in a centralized or in a distributed fashion, but only the centralized routing operation can guarantee the overall optimization for all the flows with a given set of constraints and goals. An example architecture to support such a technique may be found in the IETF draft entitled "An Architecture for IPv6 over the TSCH mode of IEEE 802.15.4e" by Thubert et al. (February 2014), and referred to herein as "6TiSCH". The centralized computation is typically done by a PCE with an objective function that represents the goals and constraints. A PCE may compute not only an optimized Layer 3 path for purposes of traffic engineering, but also to compute time slots associated with a deterministic flow at the same time as it computes a route over an LLN. Generally speaking, this requires the PCE to have knowledge of the flows as well as knowledge of the radio behavior at each hop (e.g., an estimation of the expected transmission count (ETX) so as to provision enough time slots for retransmissions).

For distributed routing, 6TiSCH relies on the RPL routing protocol (RFC6550). The design of RPL also includes the capability to build routing topologies (e.g., "instances" in RPL parlance) that are associated with objective functions, but in a distributed fashion. With RPL, the routing operations will be more efficient (e.g., with no need of CPU intensive PCE computations) and resilient (e.g., with no dependence on a PCE for base routing and recovery).

Of note is that scheduling is not a part of RPL and may be designed for the distributed routing scheme. Although it is not possible to guarantee that an individual path is fully optimized, or that the distribution of resources is globally optimized, it may be possible to impose deterministic behavior along a routing path (e.g., an ultra-low jitter, controlled latency, etc.).

For the underlying MAC operation, 6TiSCH relies, as its name shows, on time slotted channel hopping (TSCH). More specifically, 6TiSCH is being designed for the IEEE802.15.4e TSCH mode of operation. This is the standardized version of the MAC that was adopted by all industrial WSN standards, ISA100.11a, WirelessHART and WIAPA.

The time slotted aspect of the TSCH technology is a time division multiplexing (TDM) technique, which requires all nodes in the network to be time synchronized. In other words, time is sliced up into time slots with a given time slot being long enough for a MAC frame of maximum size to be sent from mote B to node A, and for node A to reply with an acknowledgment (ACK) frame indicating successful reception.

TSCH is different from traditional low-power MAC protocols because of its scheduled nature. In TSCH, all nodes in the network follow a common communication schedule, which indicates for each active (e.g., transmit or receive) timeslot a channel offset and the address of the neighbor to communicate with. The channel offset is translated into a frequency using a specific translation function which causes pairs of neighbors to "hop" between the different available channels (e.g., frequencies) when communicating. Such channel hopping technique efficiently combats multi-path fading and external interference. Notably, since 6TiSCH is based on TSCH, 6TiSCH also uses the basic TSCH concepts of a schedule and time slots. However, since 6TiSCH may extend over several interference domains with distributed routing and scheduling, there is no longer the concept of a single schedule that would centralize all the transmissions and receptions. In particular, with 6TiSCH, some TSCH concepts may still apply globally and their configurations must be shared by all nodes in the network, but other concepts may be local to a given node in 6TiSCH. For example, the hopping schedule in 6TiSCH may represent only the transmission to which a particular node is participating.

Figure 5:
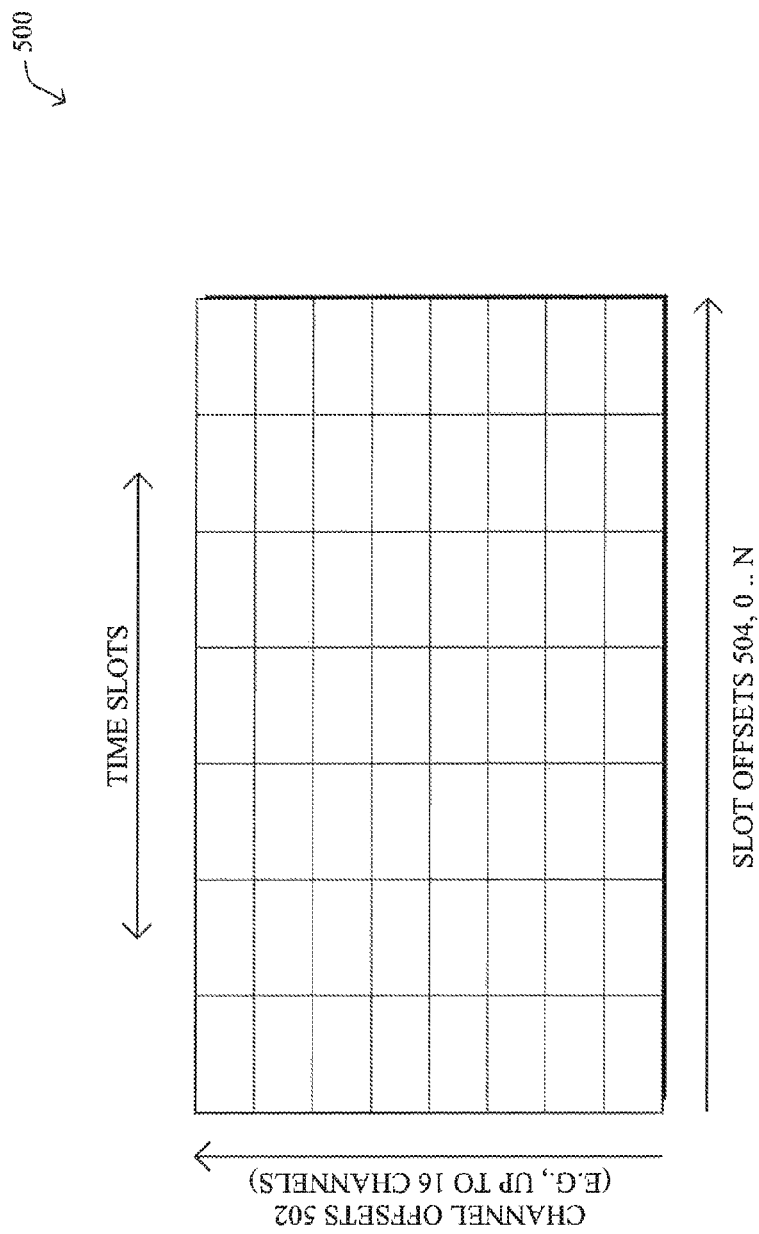
FIG. 5 illustrates an example channel distribution/usage (CDU) matrix.

Referring now to FIG. 5, an example channel distribution/usage (CDU) matrix 500 is shown that may be used by the nodes/devices 200 in network 100. Notably, 6TiSCH defines a new global concept of a CDU matrix that may repeat itself over time and represents the global characteristics of the network such as used/unused channels, timeslot durations, number of time slots per iteration, etc. As shown, CDU matrix 500 may include an index of channel offsets 502 along a first axis that correspond to the channels available for use in network 100 (e.g., offsets for each of sixteen available channels). As would be appreciated, any number of channels may be used in the network. Along the other axis are slot offsets 504 that correspond to differing time slots, the combination of which is equal to one period of the network scheduling operation.

CDU matrix 500 may be used to define the basic wireless communication operations for the network. For example, CDU matrix 500 may be used to define the duration of a timeslot (e.g., between 10 to 15 ms), the period of an iteration (e.g., the total number of time slots, indexed by slot offsets 504), and the number of channels (e.g., indexed by channel offset 502) to which the MAC may jump.

A "cell" in CDU matrix 500 is defined by the pair (slot offset, channel offset) in the epochal description of CDU matrix 500, in other words, at time t=0. During runtime, the actual channel at which a given transmission happens may be rotated to avoid interferences such as self-inflicted multipath fading.

Figure 6:
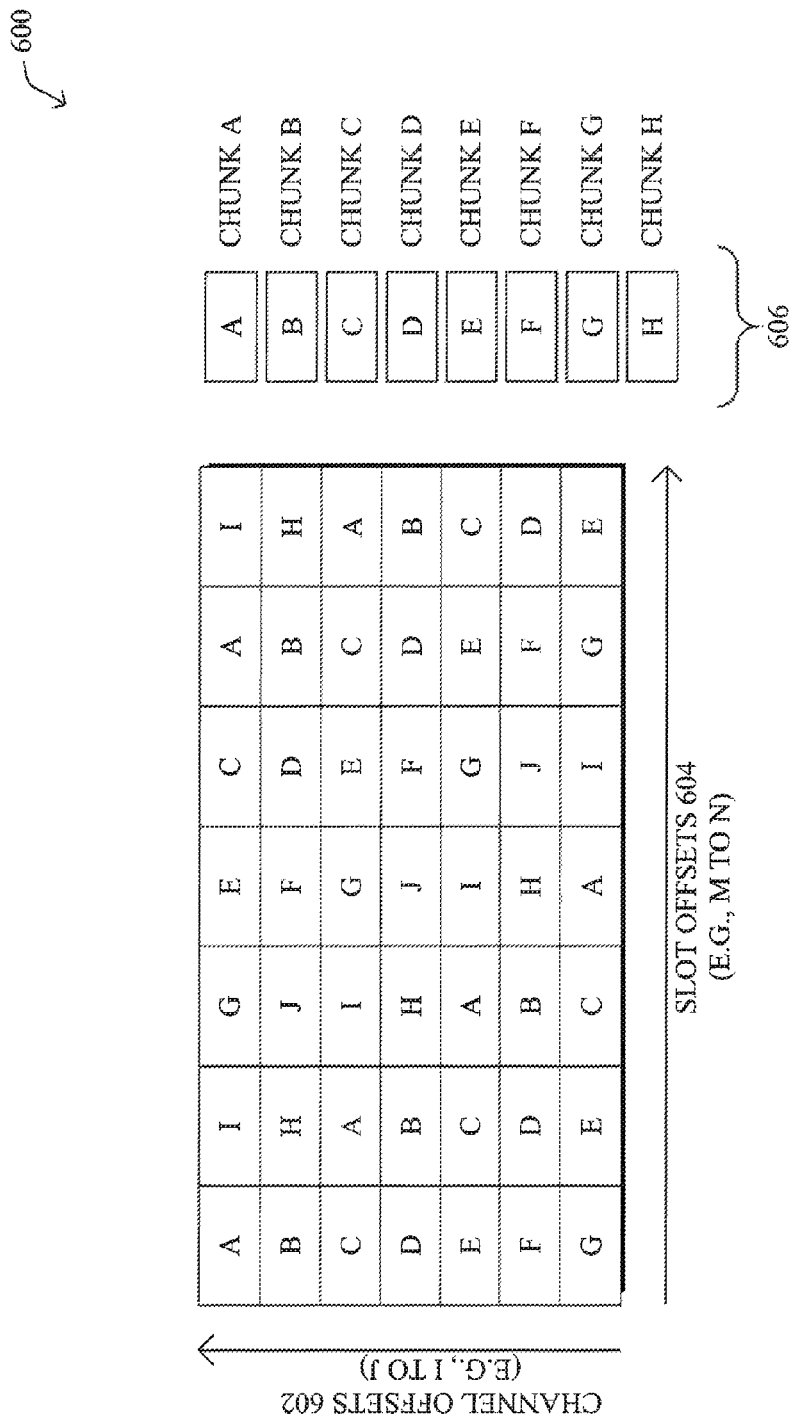
FIG. 6 illustrates example chunks of the CDU matrix of FIG. 5.

Referring now to FIG. 6, an example subset 600 of CDU matrix 500 is shown to be divided into chunks 606. In order to scale the network, the computation of the channel hopping schedule for the network may be distributed. According to some embodiments, such as those in which 6TiSCH is used, a parent node (e.g., an RPL parent) may be responsible for computing the schedule between the parent and its child node(s) in both directions. In order to allocate a cell for a given transmission, the parent node must be certain that this cell will not be used by another parent in the interference domain. As shown, for example, cells within CDU matrix 500 may be "owned" by different parent nodes within the network. The collective cells of CDU matrix 500 assigned to different parent nodes may then be grouped together as chunks 606. In one implementation, for example, CDU matrix 500 may be formatted into chunks by making a full partition of matrix 500. The resulting partition must be well known by all the nodes in the network, to support the appropriation process, which would rely on a negotiation between nodes within an interference domain.

Typically, there will be at most one cell in a chunk per column of CDU matrix 500, to reflect that a device with a single radio may not use two channels at the same time. The cells may also be well distributed in time and frequency, so as to limit the gaps between transmissions and avoid the sequential loss of frames in multipath fading due to the consecutive reuse of a same channel.

Chunks 606 may be defined at the epochal time (e.g., at the time of creation of CDU matrix 500) and the 802.15.4e operation may be repeated iteratively any number of times. Typically, the effective channel for a given transmission may be incremented by a constant that is prime with the number of channels, modulo the number of channels at each iteration. As a result, the channel of a given transmission changes at each iteration and the matrix virtually rotates.

Figure 7:
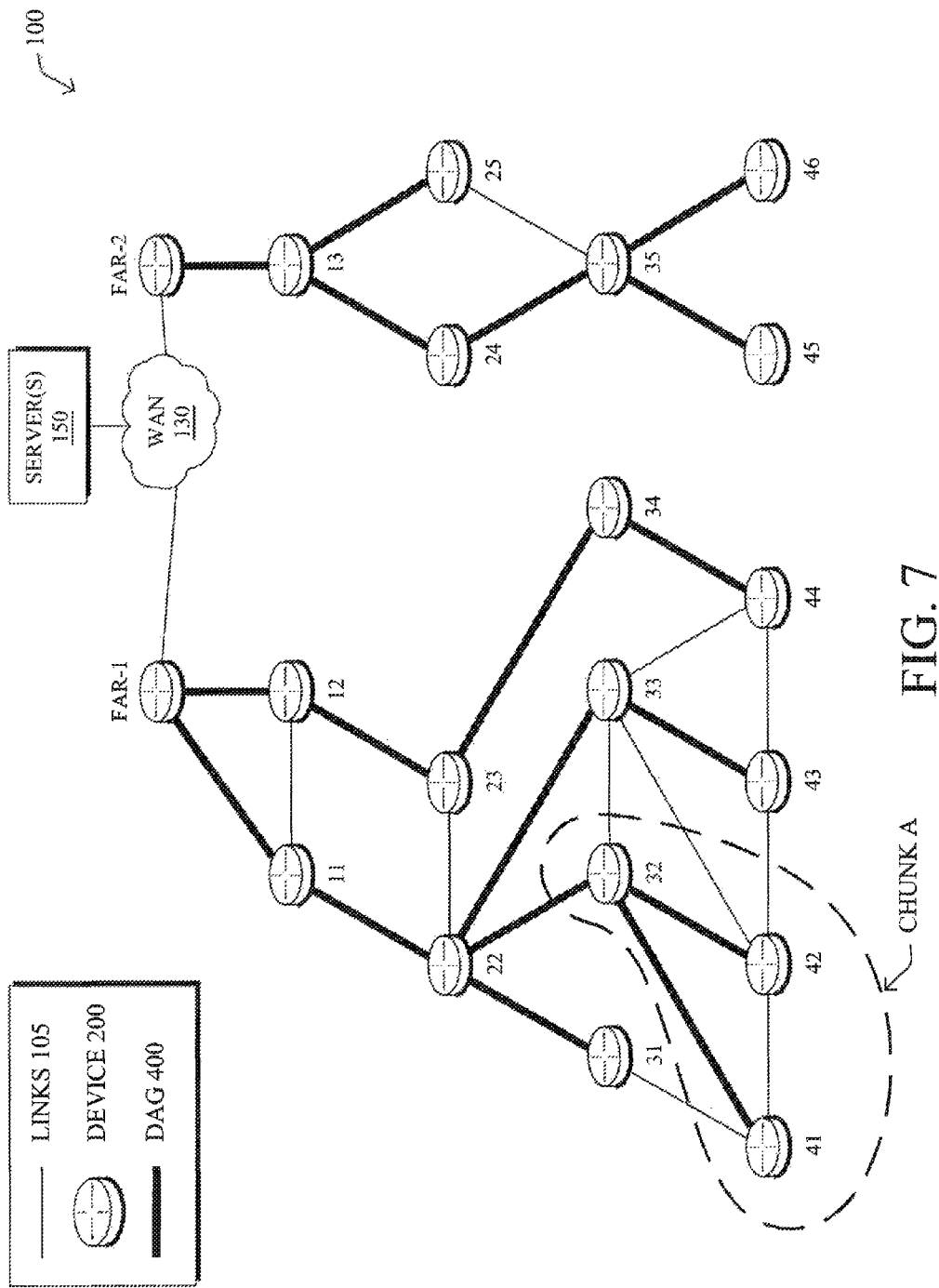
FIGS. 7-8 illustrate examples of a parent node in the network of FIG. 1 scheduling communications for a particular chunk.
Figure 8:
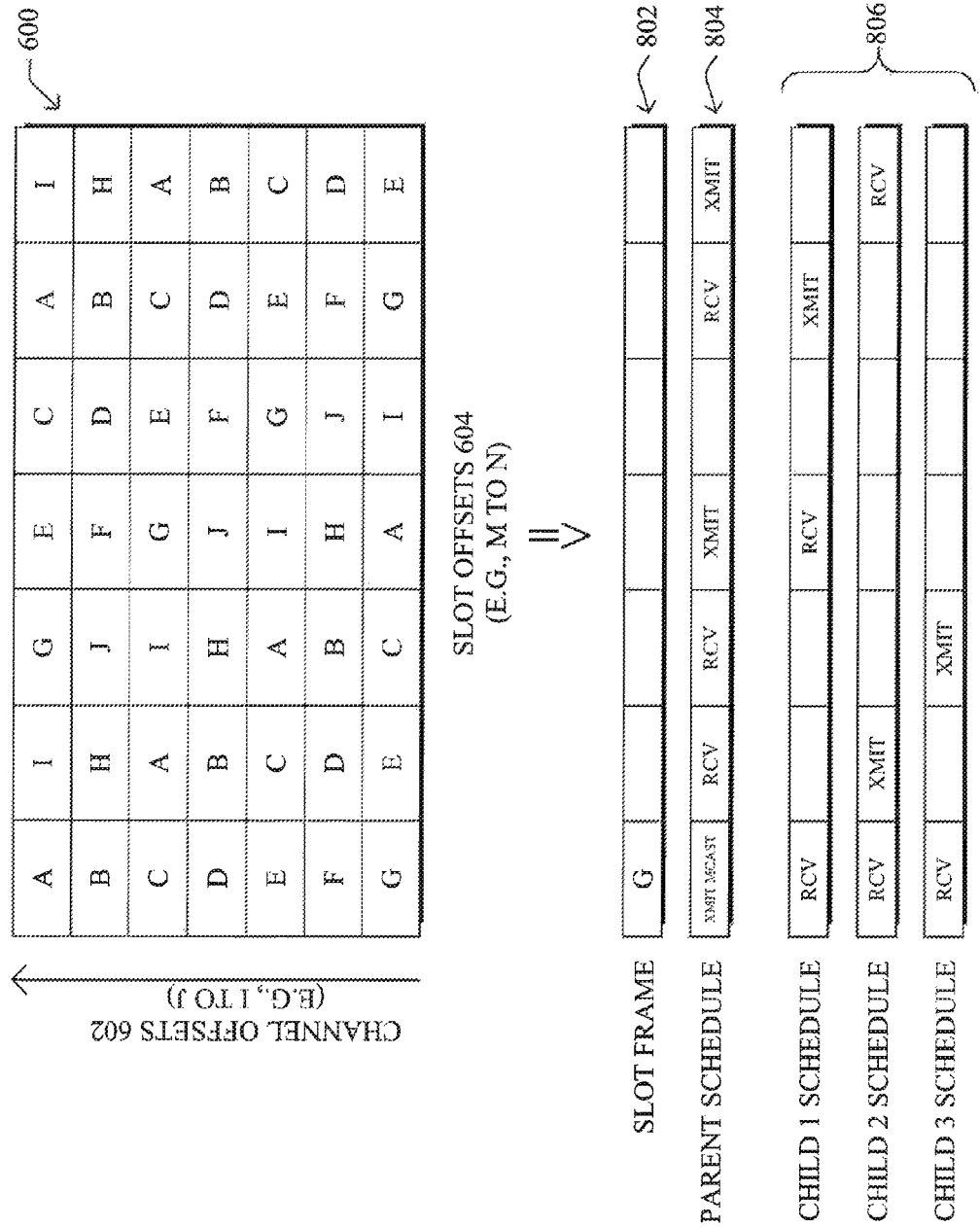

FIGS. 7-8 illustrate examples of a parent node in the network of FIG. 1 scheduling communications for a particular chunk. As shown, assume that node 32 is the parent node of child nodes 41, 42 according to the routing protocol. Node 32 may be assigned a chunk (e.g., chunk A) of CDU matrix 500, thereby allowing node 32 to manage the usage of the corresponding cells in the chunk within its interference domain. Thus, node 32 may decide which transmissions will occur over the cells in the chunk between itself and its child node(s). Ultimately, a chunk represents some amount of bandwidth and can be seen as the generalization in the time/frequency domain of the classical channel that is used to paint a wireless connectivity graph, e.g. to distribute TV frequencies over a country or WiFi channels in an ESS deployment.

If chunks are designed to form a partition of the CDU matrix 500, multiple different chunks may be in use in the same area of network 100 and under the control of different parents. In one embodiment, the appropriation process may be such that any given node that communicates using cells in a given chunk, as appropriated and managed by a parent A, should not be within the interference domain of any other node that is also communicating using the same chunk but appropriated and managed by a different parent B. Consequently, the number of parents in any given area of the network may be constrained by the number of chunks.

Referring more specifically to FIG. 8, parent node 32 may use a slot frame 802 to assign hopping schedules 804, 806 to itself and any of its child node(s), respectively. Generally speaking, slot frame 802 is a MAC-level abstraction that is also internal to the node and includes a series of time slots of equal length and priority. For example, the size of the slot frame 802 may match the CDU matrix 500. Parent node 32 may use slot frame 802 to divide the corresponding times into slots and associate the slots to a particular operation (e.g., reception, transmission, multicast operation, etc.). For example, as shown, parent node 32 and one of its child nodes may be synchronized to use the same channel during a given time slot.

Slot frame 802 may be characterized by a slotframe_ID, a slot duration, and a slotframe_size. In some implementations, multiple slot frames may coexist in a node's schedule. In other words, a node can have multiple activities scheduled in different slot frames, based on the priority of its packets/traffic flows. The different slot frames may be implemented as having the same durations/sizes or different durations/sizes, in various cases. The time slots in the slot frame may also be indexed by the slot offsets 604 (e.g., the first time slot in slot frame 802 may be indexed as slot offset 0, etc.).

In various implementations, different parent nodes may appropriate different chunks such that the chunks used throughout the network do not interfere. For example, chunks may be appropriated by different parent nodes such that, for a given chunk, the domains do not intersect. In addition, the domains for different chunks are generally not congruent since the chunks are owned by different nodes. As a result, the schedule in a node with a single radio is a series of transmissions, and the parent to child cells are taken from (one of) the chunk(s) that the parent has appropriated.

6TiSCH also defines the peer-wise concept of a "bundle," that is needed for the communication between adjacent nodes. In general, a bundle is a group of equivalent scheduled cells (e.g., cells identified by different slot offset/channel offset pairs), which are scheduled for a same purpose, with the same neighbor, with the same flags, and the same slot frame. The size of the bundle refers to the number of cells it includes. Given the length of the slot frame, the size of the bundle also translates directly into bandwidth, either logical or physical. Ultimately a bundle represent a half-duplex link between nodes, one transmitter and one or more receivers, with a bandwidth that amount to the sum of the time slots in the bundle. Adding a timeslot in a bundle increases the bandwidth of the link.

Track forwarding is the simplest and fastest forwarding model defined in the 6TiSCH architecture that specifies IPv6 over TSCH. In general, a "track" is defined as an end-to-end succession of time slots, with a particular timeslot belonging to at most one track. In this model, a set of input cells (time slots) are uniquely bound to a set of output cells, representing a forwarding state that can be used regardless of the upper layer protocol. This model can effectively be seen as a G-MPLS operation in that the information used to switch is not an explicit label, but rather related to other properties of the way the packet was received, a particular cell in the case of 6TiSCH. As a result, as long as the TSCH MAC (and Layer 2 security) accepts a frame, that frame can be switched regardless of the protocol, whether this is an IPv6 packet, a 6LoWPAN fragment, or a frame from an alternate protocol such as WirelessHART of ISA100.11a.

For a given iteration of a slotframe, the timeslot is associated uniquely with a cell, which indicates the channel at which the timeslot operates for that iteration. A data frame that is forwarded along a track has a destination MAC address set to broadcast or a multicast address depending on MAC support. This way, the MAC layer in the intermediate nodes accepts the incoming frame and the 6 top sublayer switches it without incurring a change in the MAC header. In the case of IEEE802.15.4e, this means effectively broadcast, so that along the Track the short address for the destination is set to broadcast, 0xFFFF. Conversely, a frame that is received along a track with a destination MAC address set to this node is extracted from the track stream and delivered to the upper layer. A frame with an unrecognized MAC address may be ignored at the MAC layer and thus is not received at the 6 top sublayer.

As noted above, LLN networks may be limited in terms of bandwidth and other capabilities when compared to traditional computing networks. These limited capabilities may also make it difficult to use certain techniques such as complex traffic analysis, traffic engineering, quality of service (QoS) routing, etc. within the LLN. In particular, a PCE, traffic policy engine, or other devices that implement these techniques may be located outside of the LLN, thereby increasing the traffic load in the LLN associated with using these techniques. However, not using these techniques may also negatively impact network performance. For example, congestion within an LLN may have a dramatic impact on the overall traffic in the LLN, particularly in a deterministic networking environment supporting real-time critical applications.

Lightweight Flow Reporting in Constrained Networks

The techniques herein provide a compressed and lightweight mechanism that may be used to send flow reports to a PCE or other centralized device. In some aspects, the PCE may interact with a policy engine to ensure that certain traffic rules are enforced for a particular traffic flow. In some cases, the sampling rate of signed traffic flow packets may be adjusted based on the degree of non-compliance of a given flow, the level of available resources in the network, or other such factors.

Specifically, according to one or more embodiments of the disclosure as described in detail below, a device in a network receives one or more packets that are part of a traffic flow. The device provides a sample packet to a path computation element (PCE) that includes a signature that uniquely identifies the traffic flow. The device receives a traffic flow policy for the traffic flow from a policy engine and enforces the traffic flow policy for the traffic flow.

Illustratively, the techniques described herein may be performed by hardware, software, and/or firmware, such as in accordance with the traffic flow process 249, which may include computer executable instructions executed by the processor 220 (or independent processor of interfaces 210) to perform functions relating to the techniques described herein, e.g., in conjunction with routing process 244 and channel hopping process 248/248a. For example, the techniques herein may be treated as extensions to conventional protocols, such as the various PLC protocols or wireless communication protocols (e.g., IEEE 802.15.4e 6TiSCH, etc.), and as such, may be processed by similar components understood in the art that execute those protocols, accordingly.

Figure 9A:
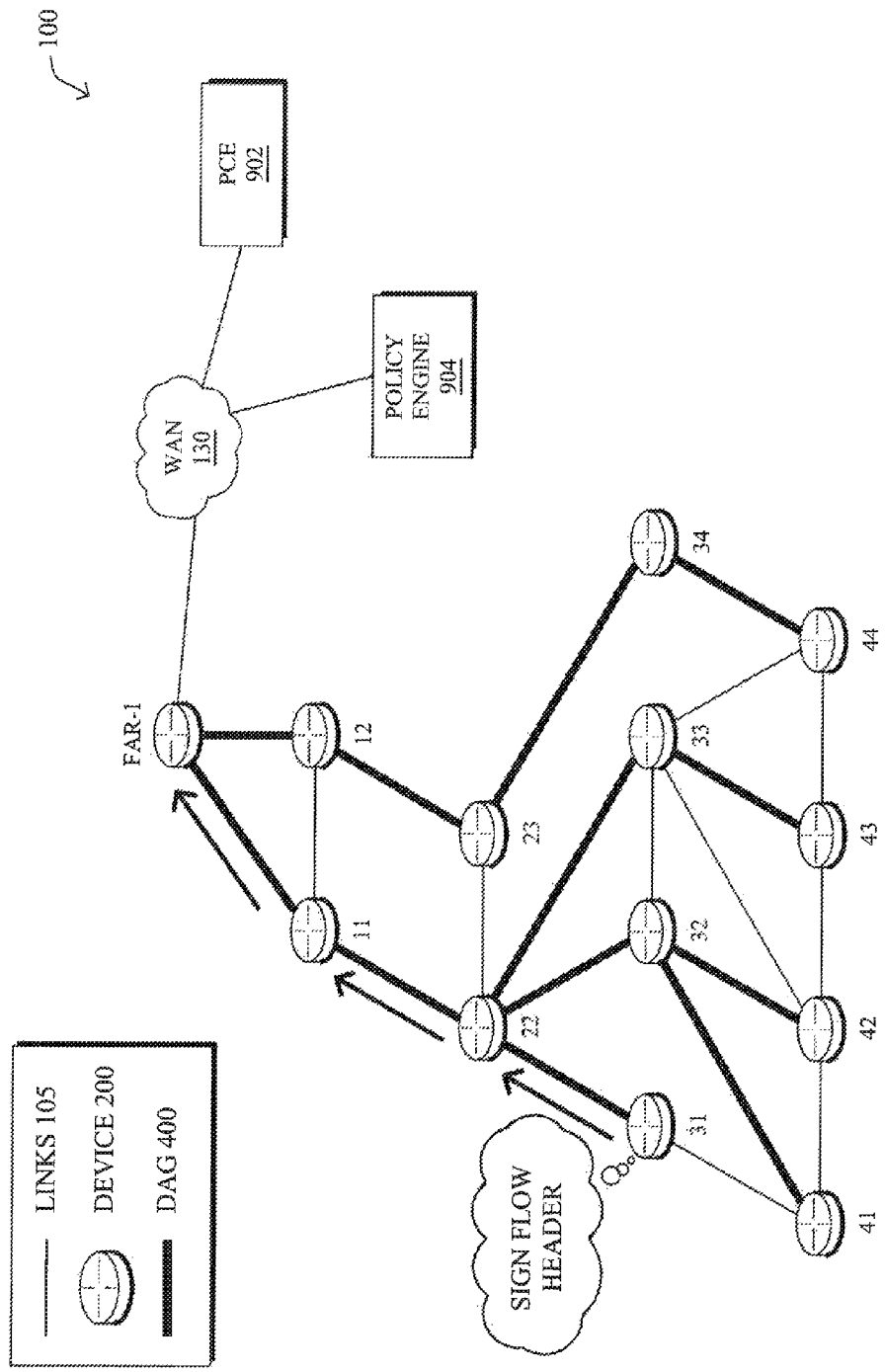
FIGS. 9A-9B illustrate examples of a packet header of a traffic flow being signed.
Figure 9B:
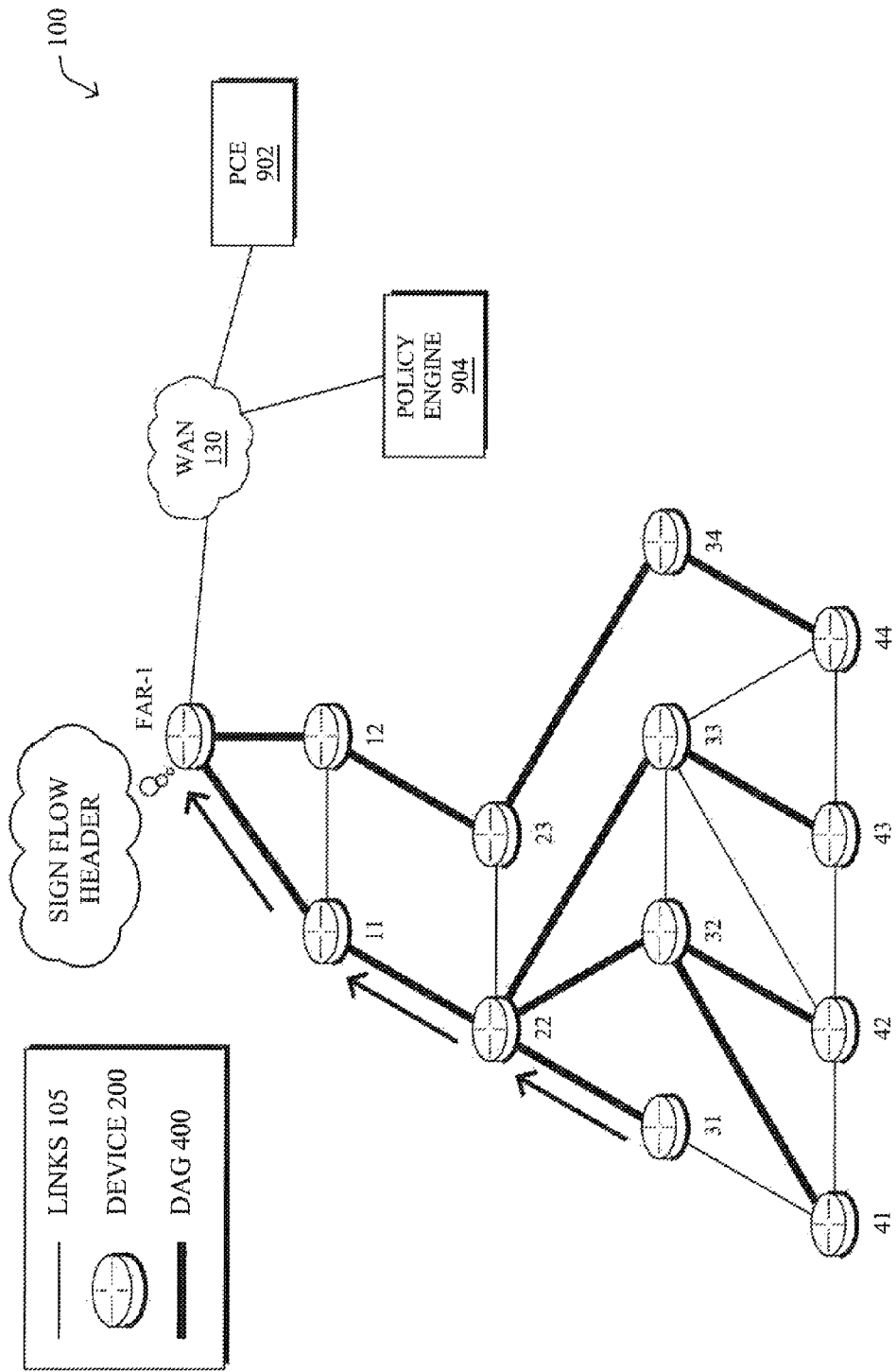

Operationally, a signature mechanism is disclosed that may be used to uniquely identify a particular flow of traffic in the network. The signature structure may be well known throughout the network and by any centralized devices that support operation of the network (e.g., a PCE, policy engine, etc.). According to various embodiments, all nodes in the network or specific nodes in the LLN may compute a signature S for each packet that they receive, if the signature has not already been added. For example, as shown in FIG. 9A, a node 31 that originates a flow of traffic (e.g., sensor measurements, user data, control commands, etc.) directed towards the FAR-1/root node may add a signature S to a packet header of the flow. In another example, as shown in FIG. 9B, the FAR-1/Root may instead be configured to add the signature to the traffic flow received from node 31. In many situations, such as in a 6TiSCH network that uses RPL, all traffic may transit through the DAG root, making the root node well suited to sign traffic flows. Traffic policies for the particular traffic flow may then be implemented by a PCE 902, policy engine 904, or any other device generally referred to as servers 150 in FIG. 1.

Figure 10:
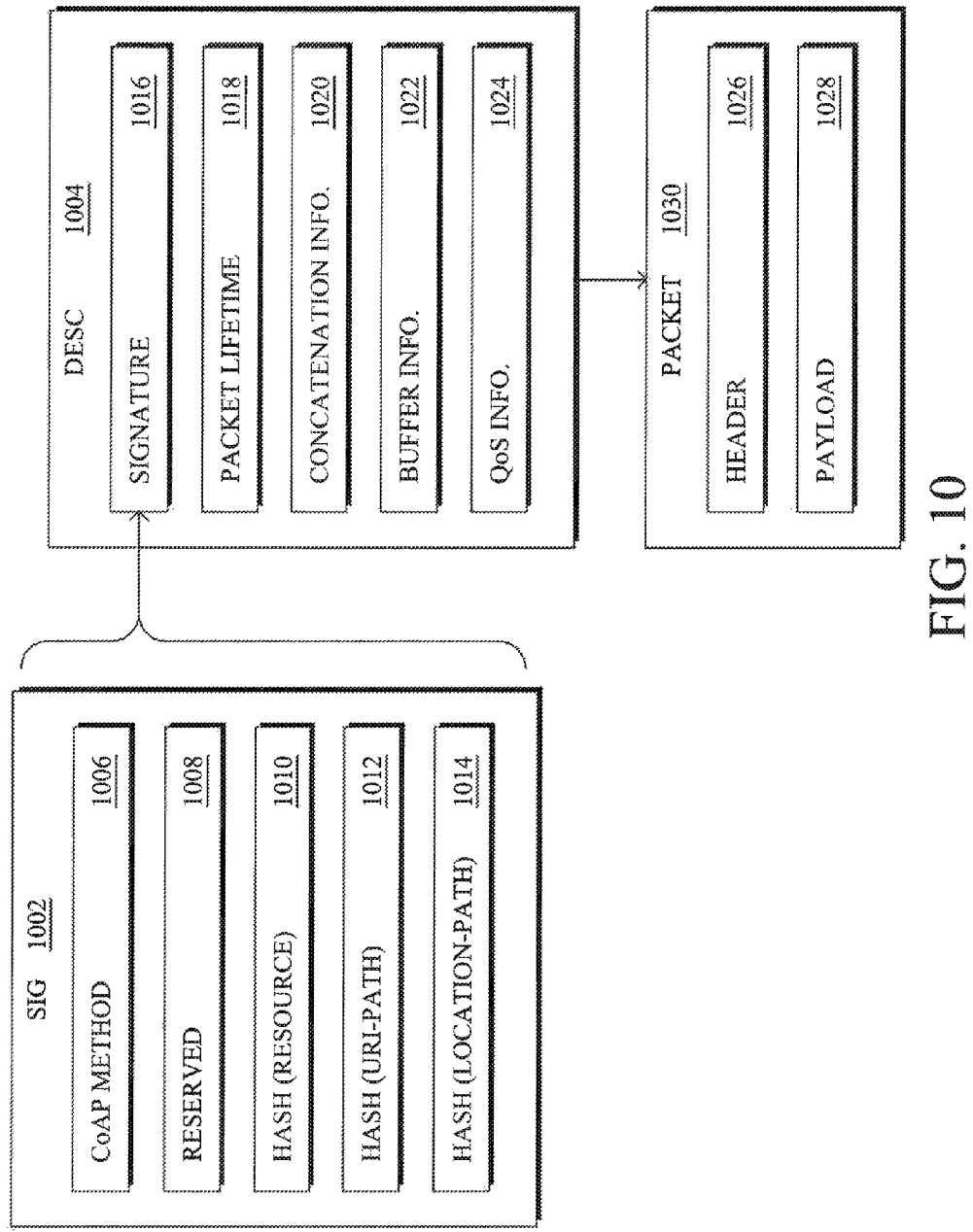
FIG. 10 illustrates an example signature mechanism for traffic flows.

An example signature mechanism for traffic flows is shown in FIG. 10, according to various embodiments. As shown, a signature data structure 1002 may be generated that summarizes the information that can be used to identify a given traffic flow. In one embodiment, values stored within signature data structure 1002 may be hashed in a manner that is well known by any or all hosts in the network. For example, certain values stored within signature data structure 1002 may be hashed to form a signature 1016 (denoted herein as 'S'). The resulting signature 1016 may be mostly or fully unique to the flow within the network, depending on the size and quality of the hash. In one embodiment, the values of signature data structure 1002 are not carried within the flow packets themselves, but how to hash the values to form signature 1016 and how to retrieve the values from hashed signature 1016 may be well known by the nodes along the communication path.

In some embodiments, a traffic flow used within the network may be a Constrained Application Protocol (CoAP) traffic flow. However, other application layer protocols may also be used with the teachings herein. As shown, the resulting hashed signature 1016 may index a particular CoAP traffic flow down to the CoAP method 1006 and/or resources 1010 used. As long as a node has enough resources available, it may additionally store states for the message identifier and the optional CoAP token from the signature, to perform the same actions (e.g., use the same traffic policy) for any responses that correspond to a signed request.

Optionally, hashed signature 1016 may also include IPv6 and UDP information as an extension to the hash. If this is done, the hash may be structured as Hcoap.Hip Where Hcoap is the hash from the CoAP information whereas Hip hashes the source, destination, and UDP ports. Thus, all accesses to a certain CoAP resource may be indexed and recognized independently of the endpoint (e.g., by using Hcoap.0), or may be specific to a pair of endpoints.

In some implementations, data structure 1002 may be similar to a UDP pseudo-header defined in the IETF Proposed Standard, RFC 2460, entitled "Internet Protocol, Version 6 (IPv6)" by Deering, et al. (December 1998), which is hereby incorporated by reference. In particular, it may contain a number of fields, including an enumeration for the CoAP method 1006 (e.g., a confirmable CoAP GET) and a number of other fields that are the result of the hash of strings from the CoAP protocol. For example, the resource 1010 and optional values (e.g., URI-path 1012, location-path 1014, etc.) may also be included. A reserved field 1008 may also be included, to separate the CoAP method 1006 field from the additional fields. For example, data structure 1002 may be enumerated as follows:

```
enum { conf_get = 1,
       non_conf_get = 2,
       ...
} coap_method;
```

In case of signature collision (e.g., two flows having the same signature S), if the source is aware of the collision, it may change one or more of the parameters in data structure 1002 (e.g., the source port), to obtain a unique signature. Generally speaking, the probability of a signature collision is a function of the size of the resulting hash (e.g., the larger the hash used, the less likely a collision will occur).

In addition to the signature data structure 1002, a node may generate a description data structure 1004 (denoted herein as 'DESC'). The data structure 1004 may include the signature 1016 and/or additional metadata that describes the traffic flow. The description data structure 1004 may then be written into a header 1026 of a packet 1030 carrying a payload 1028 of a traffic flow. When traffic flows are encrypted, data structure 1004 may be placed by a node into a non-encrypted portion of the packet (e.g., the DICE header, etc.), so that intermediate nodes can still make use of the description for sorting out the flow.

As shown, the description data structure 1004 may include metadata such as the packet lifetime 1018 (e.g., how old a packet can get before it makes no further sense to forward it). Structure 1004 may also include concatenation information 1020, which may indicate whether or not data can be concatenated with data of the same flow or destination, how the data may be concatenated, etc. Typically, if the data is well formatted (e.g., as a TLV), it may be concatenated. Such an operation may be required to preserve the whole data or just the DESC structure, in various cases. In some embodiments, description data structure 1004 may include buffer information 1022. Buffer information 1022 may indicate whether the data is buffered. Such information may be used, for example, to forward only the latest value while discarding all older packets still in the queue that have the same signature S.

A node may also save header 1026 for later use. For example, if packet 1030 is destroyed (e.g., congestion or other network conditions cause the destruction of the packet), a node may concatenate header 1026 with other packets of the same flow (e.g., as identified by the signature S). This may be done in a manner such that the final packet has one set of CoAP data and multiple headers. This allows preserving some critical values in the description from destruction. For example, if all of the CoAP packets in a flow report a measured temperature, and the history of the temperature is to be retained, then the temperature may be added as a separate field in the description data structure 1004 and the CoAP piece may be factorized.

Figure 11A:
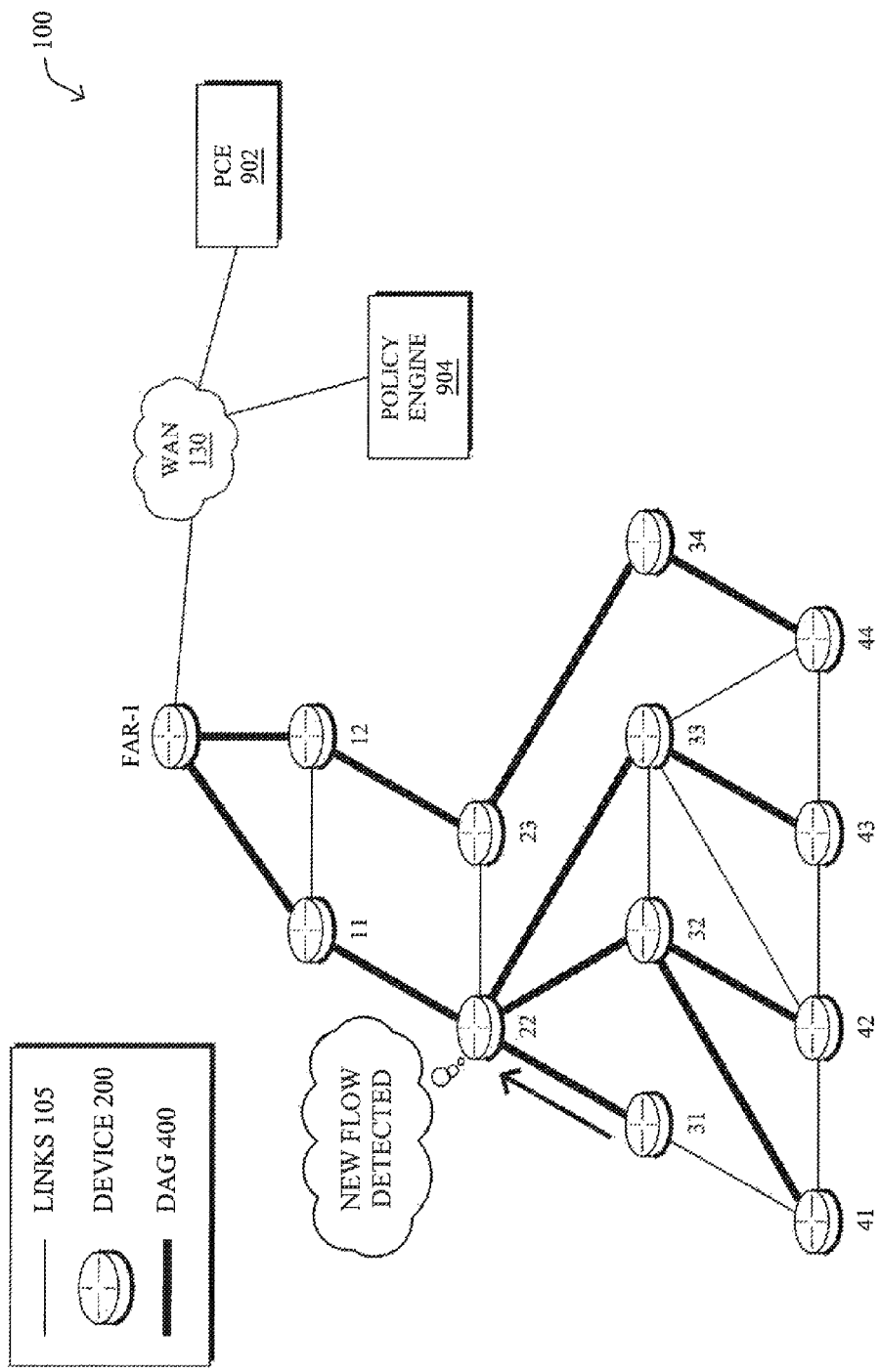
FIGS. 11A-11C illustrate a sample packet of a traffic flow being reported to a path computation element (PCE)
Figure 11B:
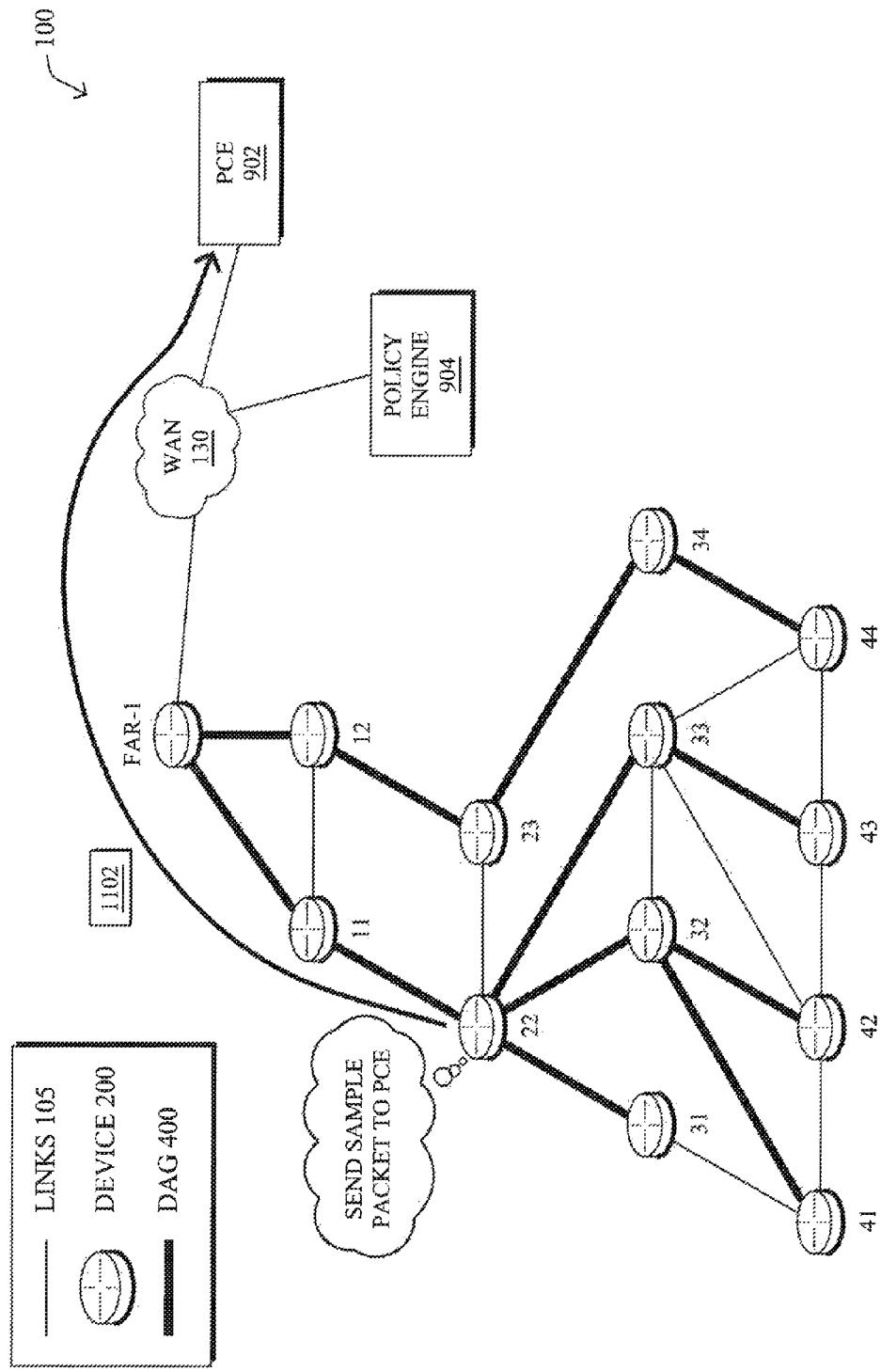

When a network node identifies a new traffic flow (e.g., by detecting a new signature in a packet header), the node may notify a centralized network device and transmit a sample packet of the flow to the centralized device. For example, as shown in FIGS. 11A-11B, node 22 may receive a new traffic flow from node 31, identify the flow as a new traffic flow based on the signature of the flow, and forward a sample packet from the traffic flow to PCE 902 for further processing. In one embodiment, node 22 may send the sample packet to PCE 902 using a tunnel destined to the DAG Root/FAR-1. In another embodiment, if the sample packet is transmitted without transiting through the DAG root (e.g., via a shortcut path), the same operation may be performed by other nodes in the network. For example, a node along the shortcut path may provide a sample packet from the traffic flow to PCE 902 if the volume of shortcut traffic crosses a threshold amount, the first and second derivative of the traffic rate exceeds a threshold amount (e.g., the rate of the traffic sharply increased, etc.), or in response to any other detected condition. Notably, the reporting of a signed packet sample from a traffic flow differs significantly from other traffic analysis mechanisms found in non-constrained environments.

Figure 11C:
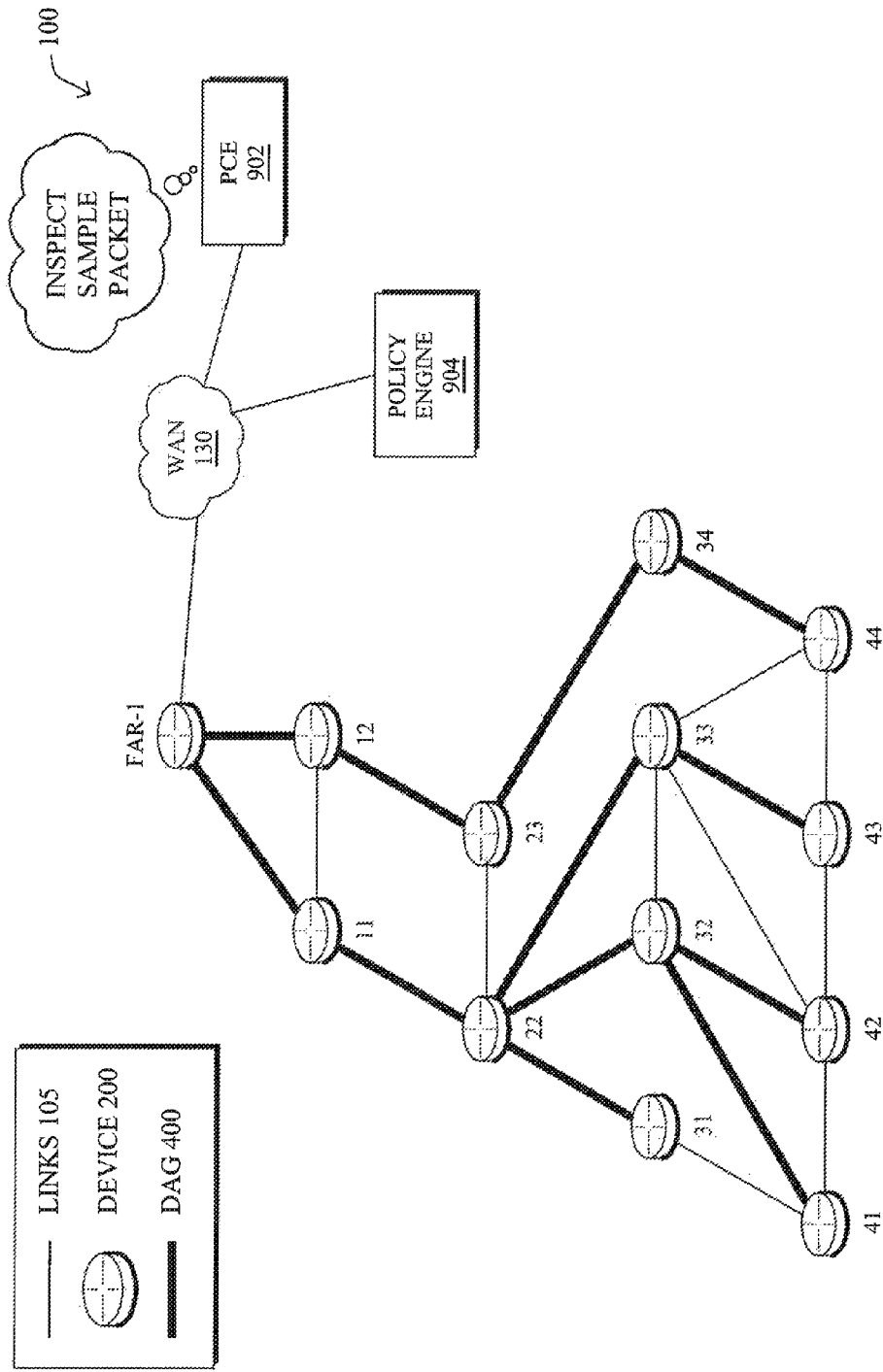
Figure 12A:
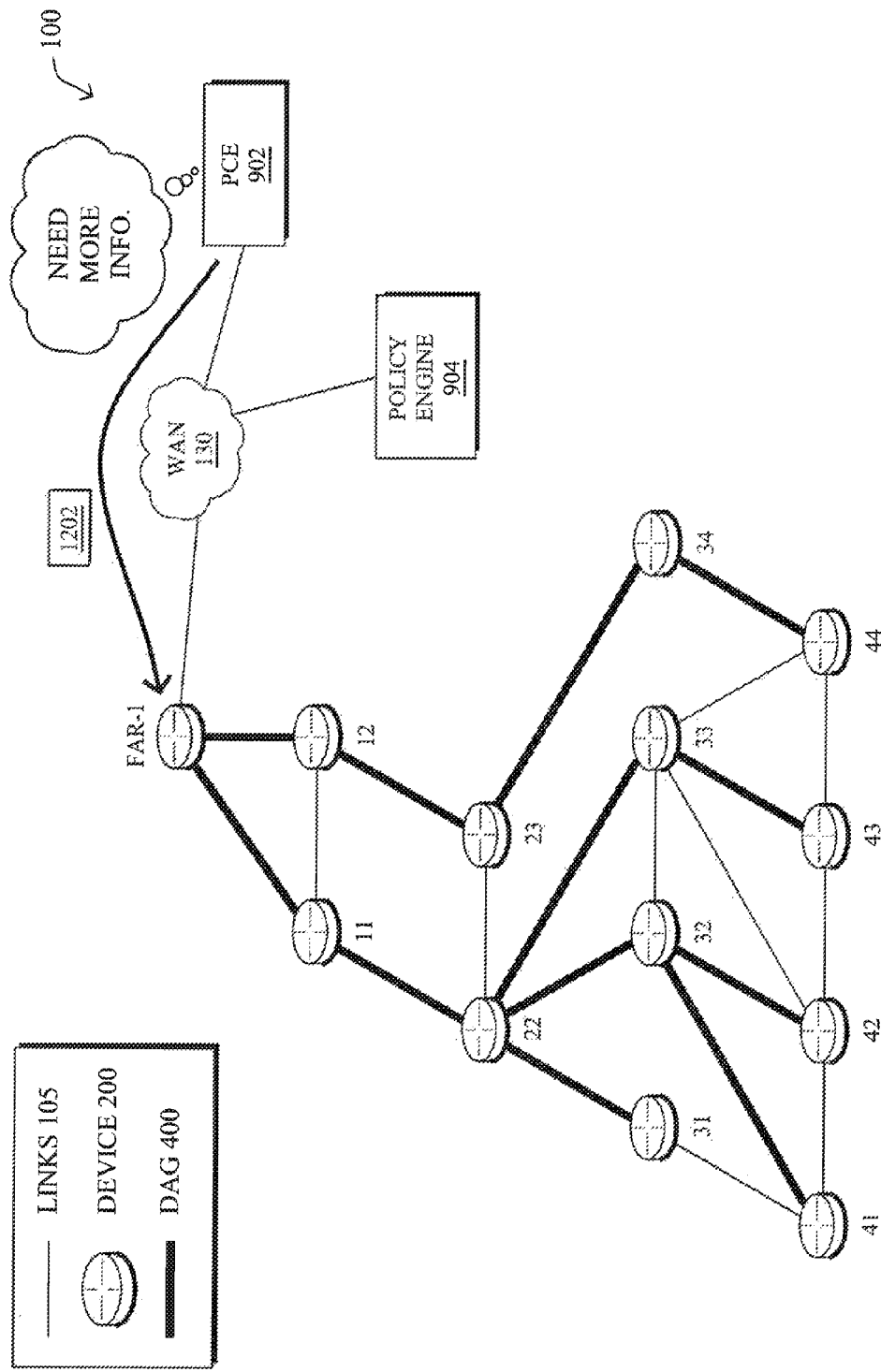
FIGS. 12A-12B illustrate a PCE requesting a traffic flow sampling strategy.
Figure 12B:
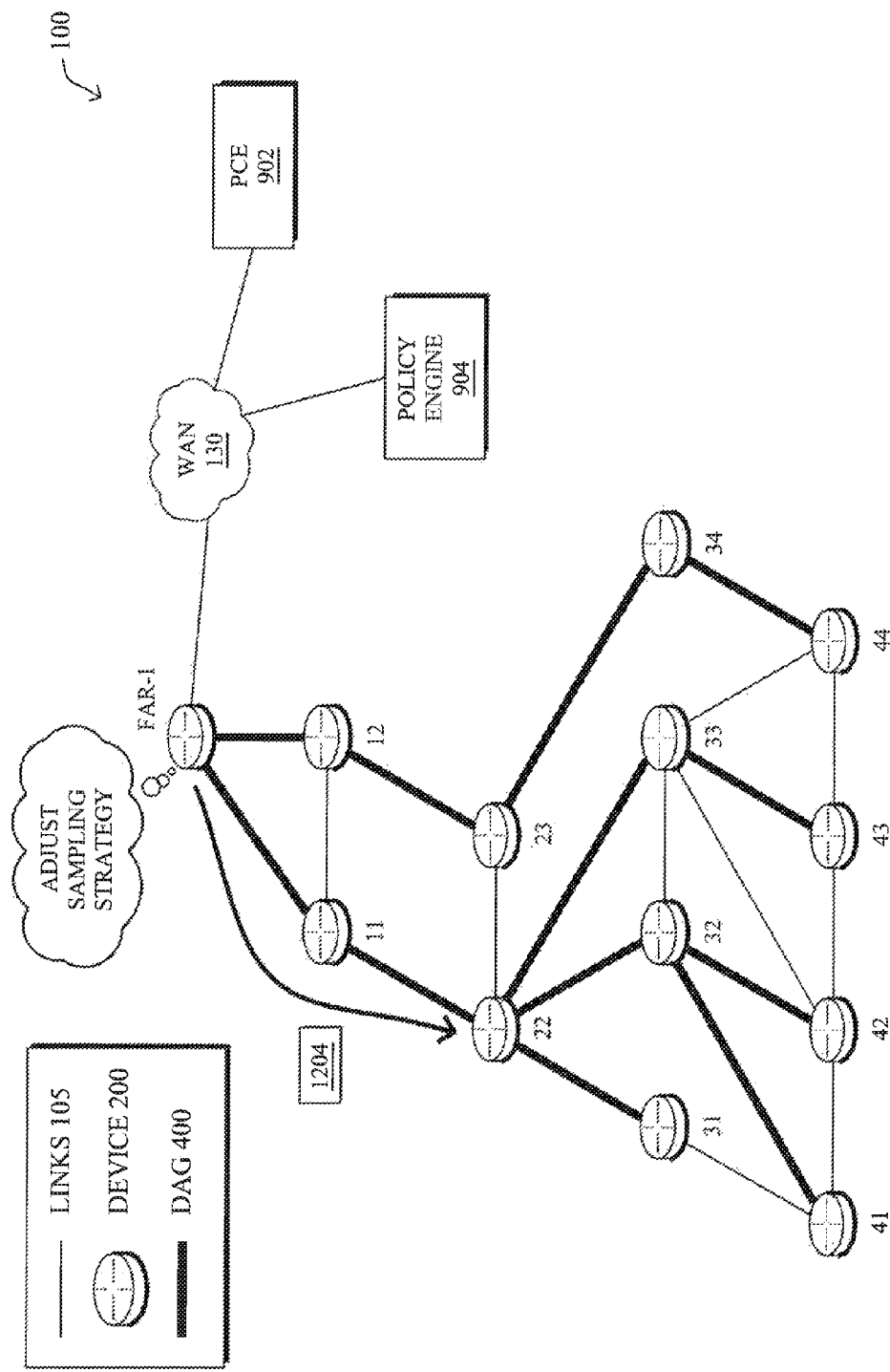

In response to receiving a notification of a new traffic flow by a node, a PCE may perform any number of operations. In some embodiments, the PCE may trigger a deep packet inspection (DPI) analysis of the sample packet. For example, as shown in FIG. 11C, PCE 902 may inspect the signed, sample packet from the new traffic flow in the network. In some embodiments, if the DPI analysis requires more packets to classify the flow, PCE 902 may request more samples of the traffic flow from one or more nodes in the network. For example, as shown in FIG. 12A, PCE 902 may send an instruction 1202 to the DAG root, instructing the root node to copy more packets with the same signature, to refine the DPI analysis. In response to receiving instruction 1202, the DAG root node may adjust the sampling strategy used by one or more of the nodes in the DAG by sending an adjustment instruction 1204. Instruction 1204 may be a custom IPv6 unicast or multicast/broadcast message (e.g., a CoaP message, etc.) that may be sent by the DAG root to one or all nodes in the network specifying the sampling frequency, packet type of interest, the duration of sampling, or any other parameters used to control the sampling of traffic flow packets. Note that the sampling strategy may be simple (e.g., copy packet of type T with signature S for a period of time T) or much more complex. For example, in some implementations, a sampling period of T may be dynamically computed using a learning machine that takes into account how accurately the flow is captured using a mathematical model, to determine the number of required sample packet. Such a model may also take into account the available network resources.

In some embodiments, traffic flow sampling adjustments may be based in part on the characteristics of the network. For example, PCE 902 and/or the DAG root may take into account the path characteristics (e.g., level of congestion) to the sampling node, the characteristics of the node itself (e.g., battery level, etc.), or other such information, to adjust the rate at Which sample packets should be reported to PCE 902.

If a traffic flow was used by the PCE to pre-compute a time-based schedule, the PCE may already have more detailed information about the flow. For example, PCE 902 may already have information such as the maximum delay, application type, high level protocols used, priority, etc., for a particular resource on a particular class of nodes.

Figure 13A:
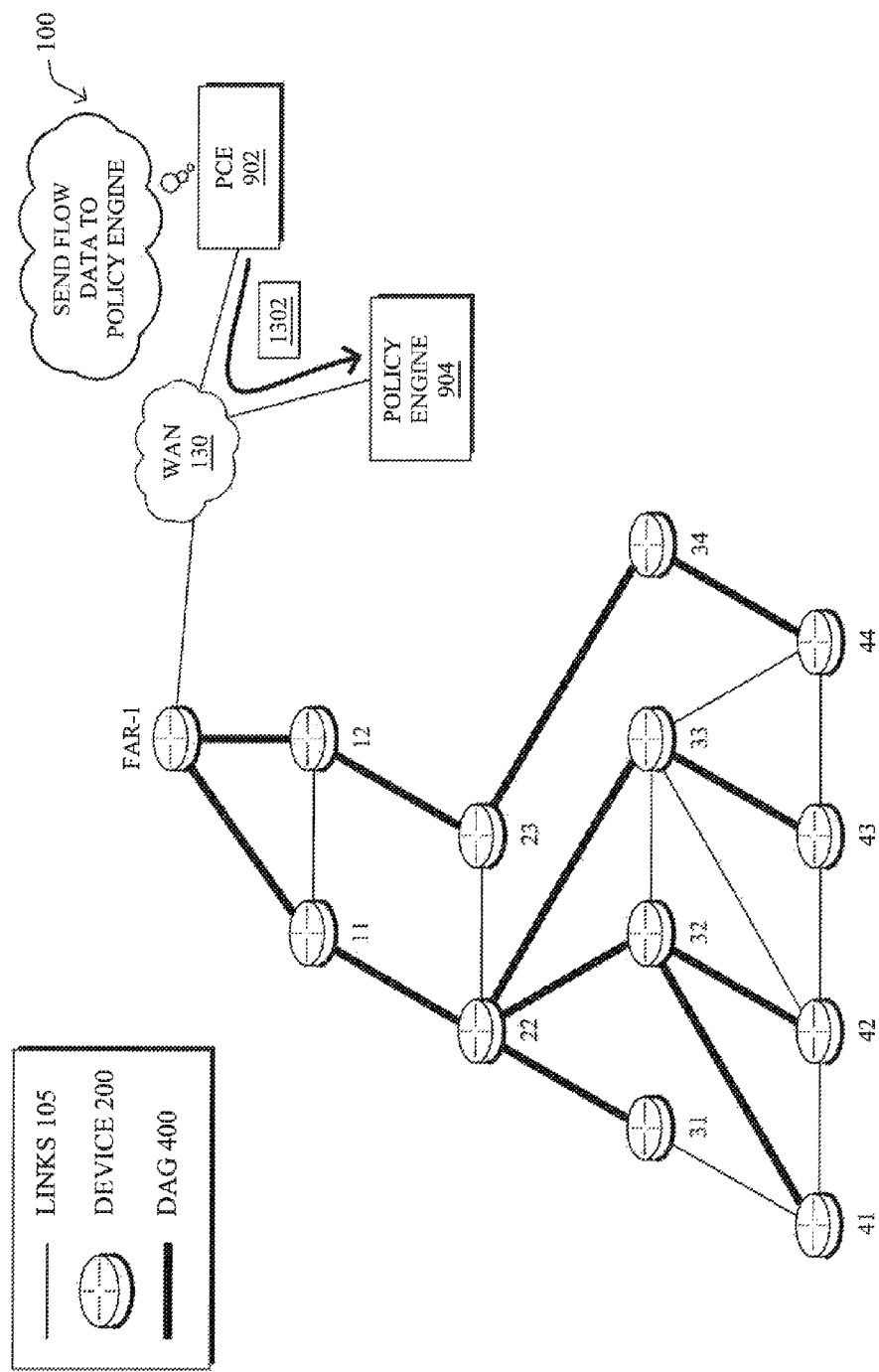
FIGS. 13A-13D illustrate a policy engine installing a traffic policy at a network node.

As shown in FIG. 13A, PCE 902 may send data 1302 regarding an analyzed traffic flow to policy engine 904. For example, PCE 902 may employ a Netflow agent, which may or may not be co-located on PCE 902, to compute statistics for the traffic flow (e.g., average duration, application breakout, etc.). Such statistics may be included in data 1302 sent by PCE 902 to policy engine 904.

Figure 13B:
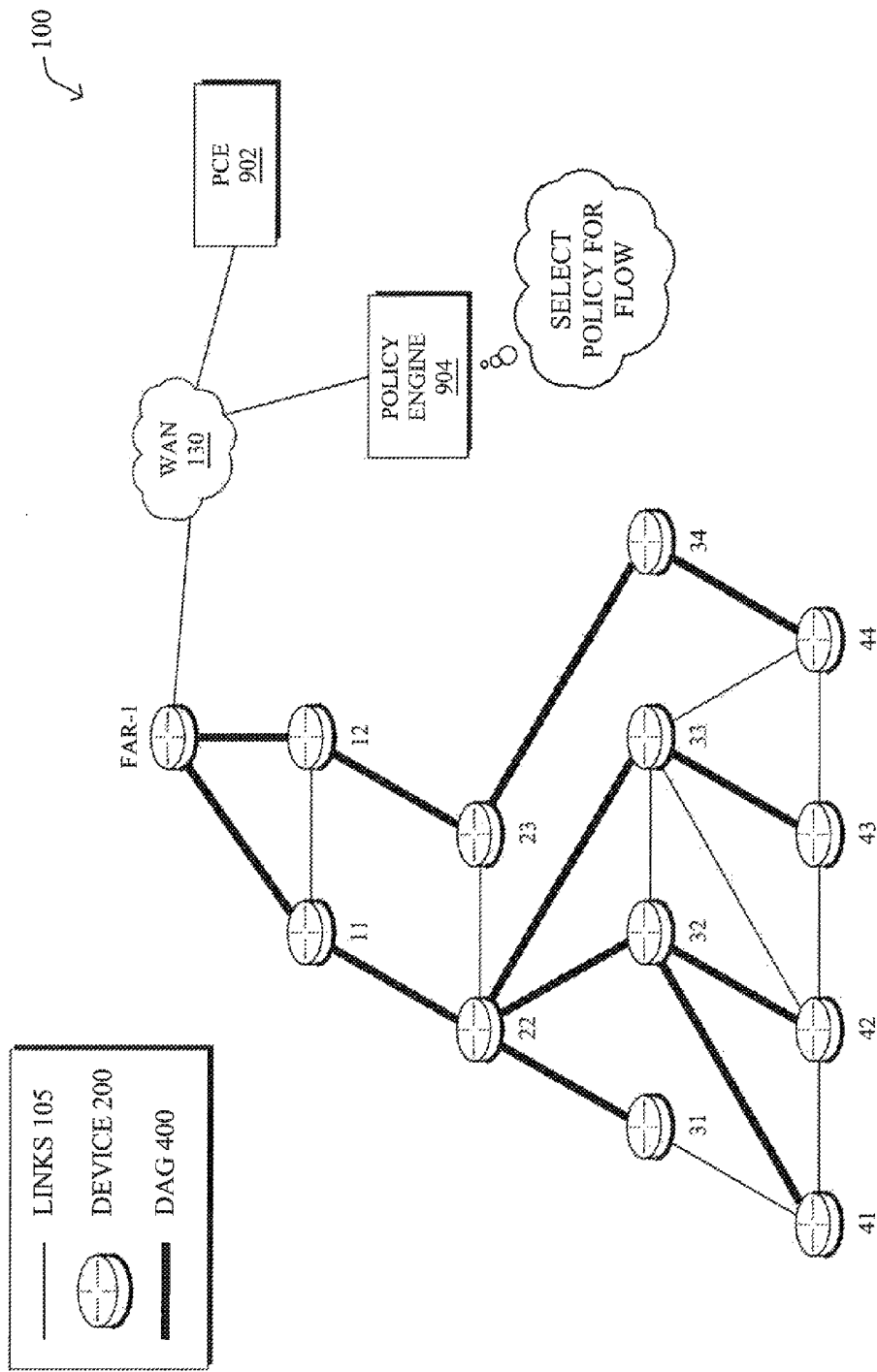

In response to receiving data 1302 regarding a particular traffic flow, policy engine 904 may select an appropriate traffic policy for the flow, as shown in the example of FIG. 13B. The selection may be based on predefined rules (e.g., configurations, thresholds, etc.) local to policy engine 904 or, in some implementations, based on rules computed by a learning machine executed by policy engine 904.

Figure 13C:
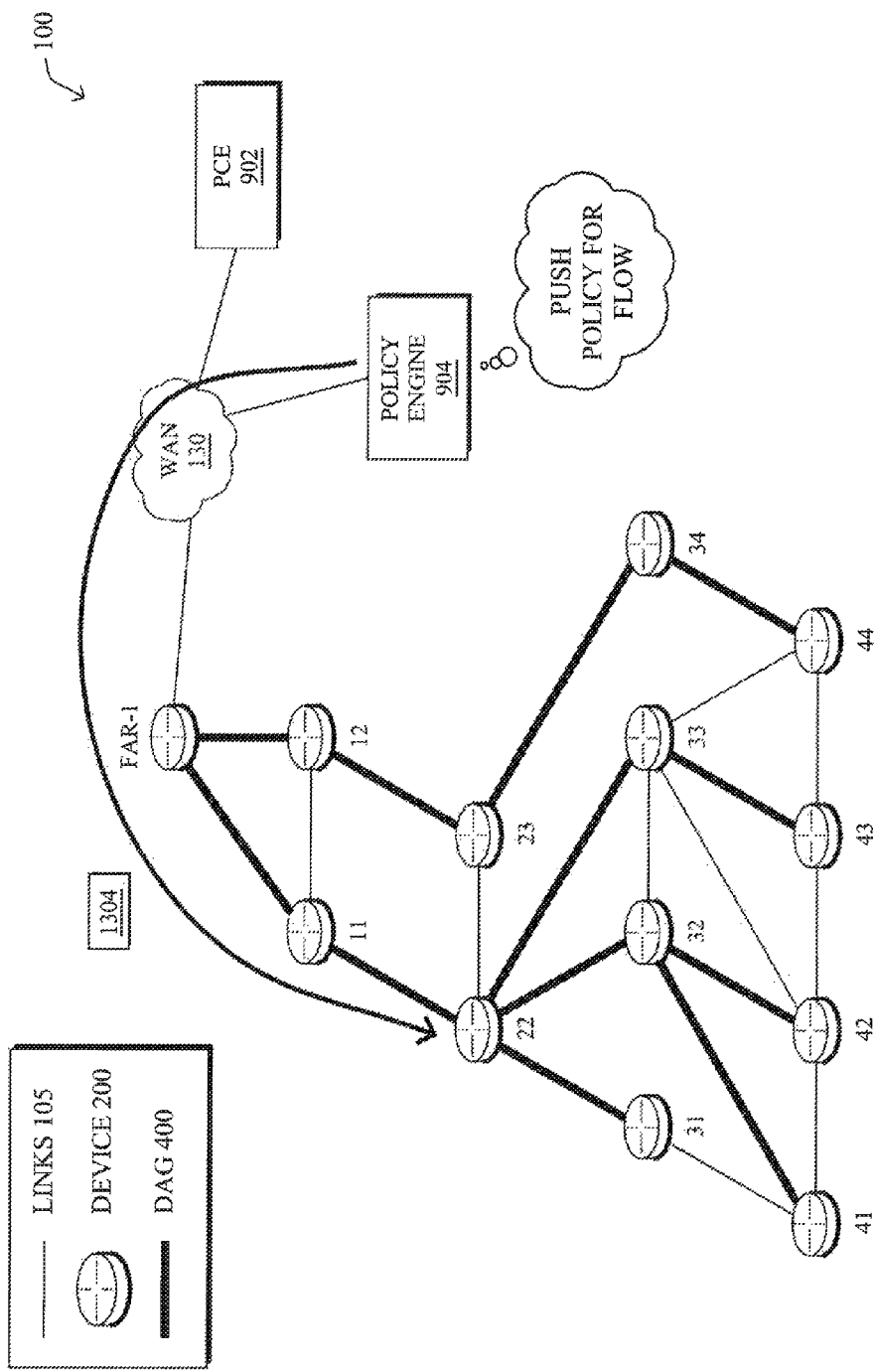

Policy engine 904 may use the services of PCE 902, to push a selected traffic policy 1304 to the LLN node(s), along with the signature of the corresponding traffic flow. For example, as shown in FIG. 13C, policy engine 904 may push a traffic policy instruction 1304 to node 22, thereby instructing node 22 how to process packets belonging to the traffic flow. For example, a simple traffic policy may rate limit a flow and/or adapt the priority of the flow on the fly. For example, node 22 may implement a rate limit on the traffic flow originating from node 31. In other cases, more complex traffic policies may be installed at a node. For example, traffic policy instruction 1304 may specify an access control list. In response to such an instruction, node 22 may filter flows or enable a packet dropping mechanism whereby certain traffic flow packets may be dropped based on a queue length or wait time in the queue. For example, if PCE 902 determines that a set of nodes (or all the nodes) sending traffic of type X tend to exceed the allowed traffic rate for this class of traffic, instruction 1304 may instruct a node to enforce local traffic shaping at a rate reported by PCE 902. Note that the enforcement policy may take into account the user-based policy and/or the traffic characterization used by the PCE in a TSCH network, along with the network resource. For example, if PCE 902 makes an assumption that a traffic flow F will have a set of available resource available when computing the time-schedule for flow F, policy engine 904 may strictly enforce the traffic policy for flow F, knowing that PCE 902 computed the path based on the resource assumptions.

Figure 13D:
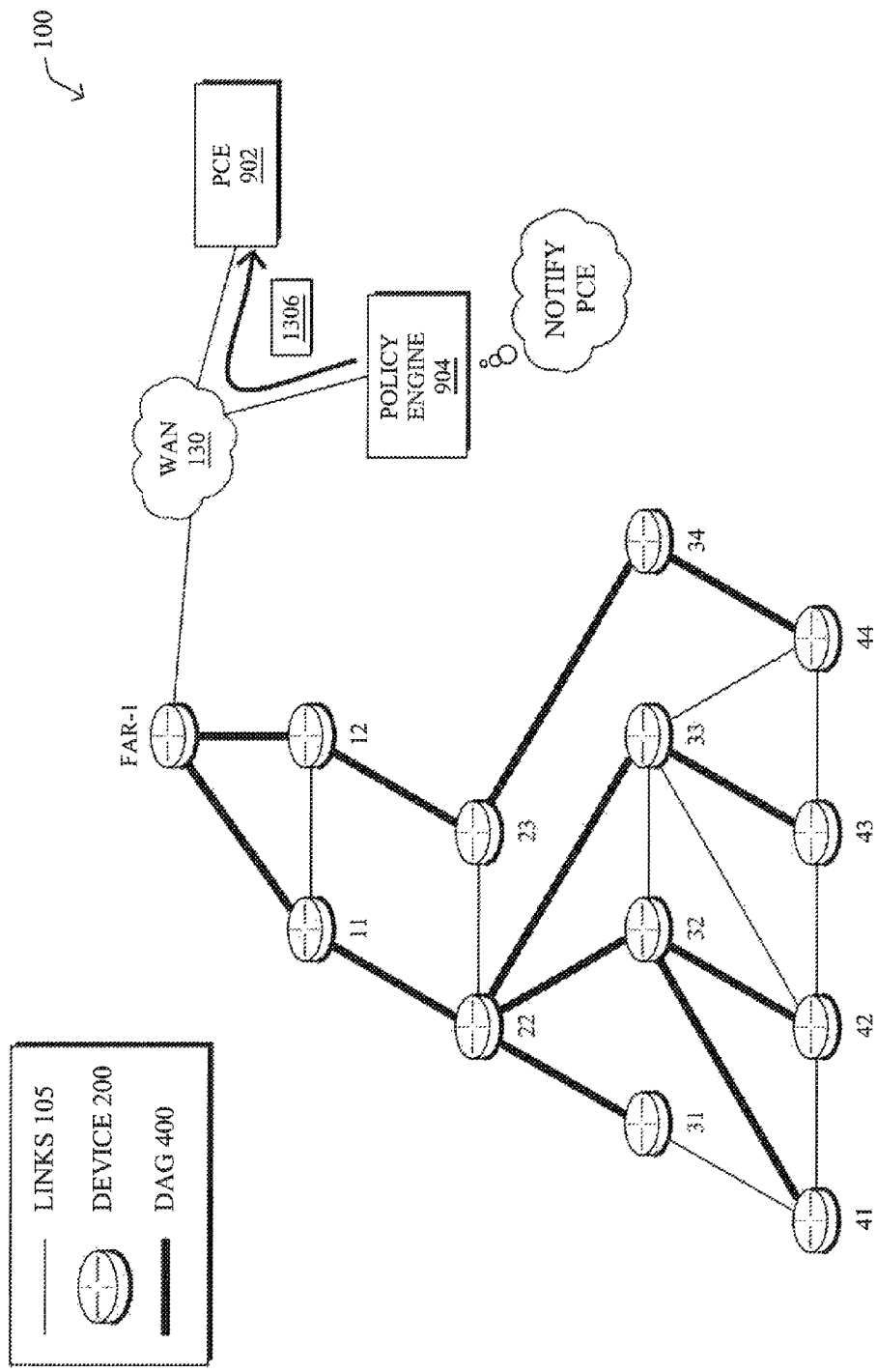

Once policy enforcement is request by the policy engine for a flow type T on a node N, the policy engine may provide the information to the PCE. For example, as shown in FIG. 13D, policy engine 904 may send a notification 1306 back to PCE 902 regarding the traffic policy for traffic flow of type T. In turn, PCE 902 may adjust the sample rate for this type of traffic flow. For example, PCE 902 may increase the sample rate for the traffic flow for a period of time, to ensure that the traffic policy was applied by the corresponding node. If the node does not comply with the enforcement, policy engine 904 may further trigger more radical action (e.g., requesting to remove time slot of the nodes, activate input packet drops on immediate neighbors on the non-compliant node, etc.).

Figure 14:
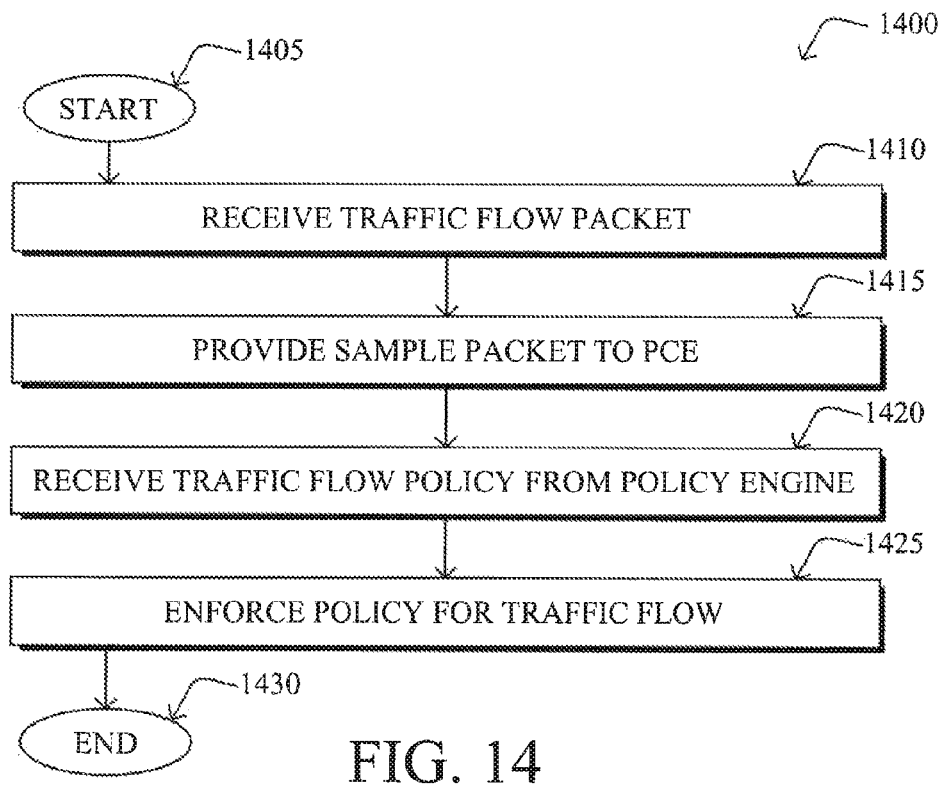
FIG. 14 illustrates an example simplified procedure for enforcing a traffic policy for a traffic flow.

FIG. 14 illustrates an example simplified procedure for enforcing a traffic policy for a traffic flow in accordance with one or more embodiments described herein. The procedure 1400 may start at step 1405, and continues to step 1410, where, as described in greater detail above, a packet of a traffic flow is received. In some embodiments, the packet flow may be received by a DAG root. In other embodiments, the packet flow may be received by another network node located along the communication path for the traffic flow.

At step 1415, the device provides a sample packet from the traffic flow to a PCE, as described in greater detail above. In various embodiments, the sample packet may include a traffic flow signature a hash value that uniquely identifies the flow within the network). Such a signature may be generated and appended to the header of the sample packet by the device itself, by the originating device of the traffic flow, or by another node along the communication path of the flow, in various embodiments. In some implementations, the sample packet may be forwarded to the PCE based on a determination that the packet belongs to a new traffic flow (e.g., the signature of the packet is newly identified by the device). In other cases, the sample packet may be provided to the PCE in accordance with a sampling strategy promulgated by the PCE (e.g., the PCE instructed the device to return samples of the traffic flow). Like the signature, the header of the sample packet may also include additional information regarding the traffic flow, such as QoS parameters, concatenation information, buffering information, or the like (e.g., as determined by the device, the originating node, or another node).

At step 1420, a traffic flow policy for the traffic flow is received from a traffic policy engine, as detailed above. In general, the traffic flow policy instructs the receiving device as to how the device is to treat packets belonging to the sampled traffic flow (e.g., based on the signatures of the flow packets). Example traffic policies may include, but are not limited to, policies that dictate a flow rate, when packets of the traffic flow may be dropped (e.g., based on queuing times, etc.), access lists, causing the traffic flow to be rerouted, or any other parameters that may control how the traffic flow is routed within the network.

At step 1425, the device then enforces the received traffic flow policy, as described in greater detail above. For example, if the device receives a packet that includes a hash/signature that identifies the packet as part of a particular traffic flow, the device may forward the packet in accordance with the traffic policy for the flow (e.g., by limiting the flow rate for the traffic flow, etc.). Procedure 1400 then ends at step 1430.

Figure 15:
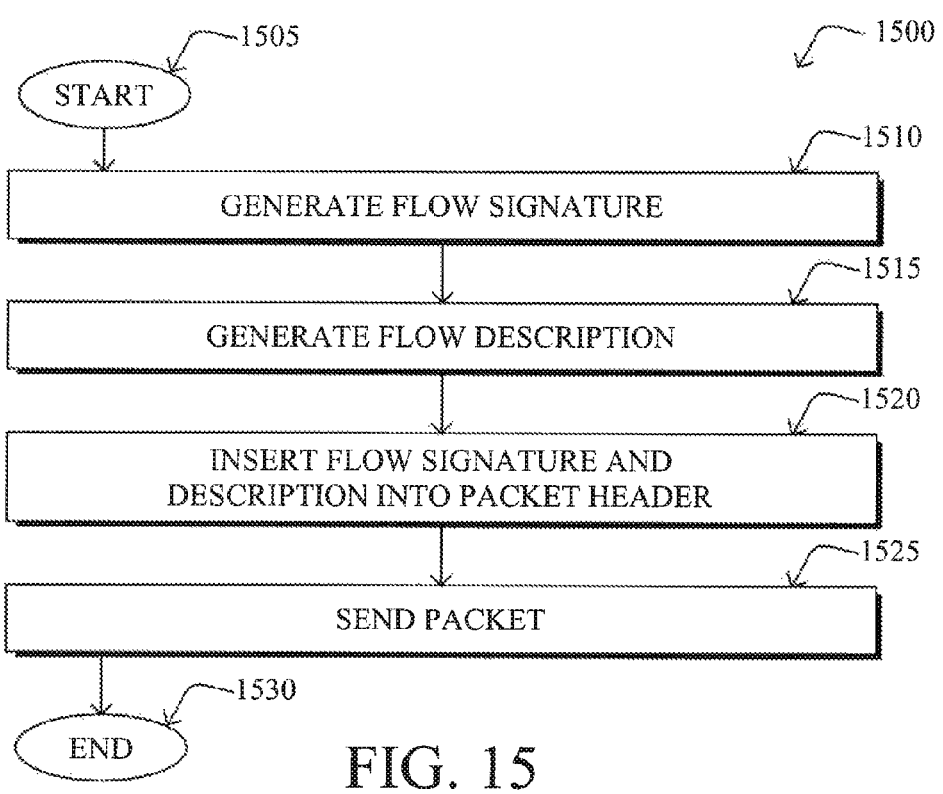
FIG. 15 illustrates an example simplified procedure for signing a packet of a traffic flow.

FIG. 15 illustrates an example simplified procedure for signing a packet of a traffic flow in accordance with one or more embodiments described herein. The procedure 1500 may start at step 1505, and continues to step 1510, where, as described in greater detail above, a signature for a traffic flow is generated. As highlighted above, a flow signature may be generated by the node that originates the traffic flow, a DAG root through which the flow traverses, or any other node along the communication path of the traffic flow. In various embodiments, the generated signature may be a hash of parameter values that identify the resource, method (e.g., CoAP method), URI-path, location path, or any other such information that may be used to differentiate traffic flows. Typically, the hash mechanism may be well known throughout the network such that a device that receives the hash may obtain the parameter values from the hash. A signature generated in such a way may generally be unique within the network, provided the hash function is sufficiently large. In the rare case that a signature collision is detected, a new signature may be formed for the second traffic flow.

At step 1515, a traffic flow description is generated, as detailed above. In some embodiments, the flow description may include the signature generated in step 1510. Further information regarding a flow that may also be included in the description may relate to the QoS requirements of the flow, a packet lifetime value, concatenation information (e.g., whether or not packets from the flow can be concatenated, etc.), buffering information, and the like.

At step 1520, the flow signature and description are inserted into a header of a packet belonging to the traffic flow, as described in greater detail above. In one embodiment, this information may be placed into a non-encrypted packet header DICE header, etc.), so that the information may be used by some or all of the intermediate nodes along the communication path of the flow. For example, the signature and/or description included in the packet header may be used by an intermediate node to enforce a traffic policy associated with the traffic flow.

At step 1525, the signed packet is then sent to another device, as detailed above. In some embodiments, the packet is sent to the next node along the communication path for the traffic flow. In another embodiment, the signed packet is sent to a PCE. For example, the signed packet may be send to the PCE as a sample packet for the traffic flow. In turn, the PCE may analyze the traffic flow and coordinate with a policy engine, to install a traffic policy for the flow within the network. Procedure 1500 then ends at step 1530.

Figure 16:
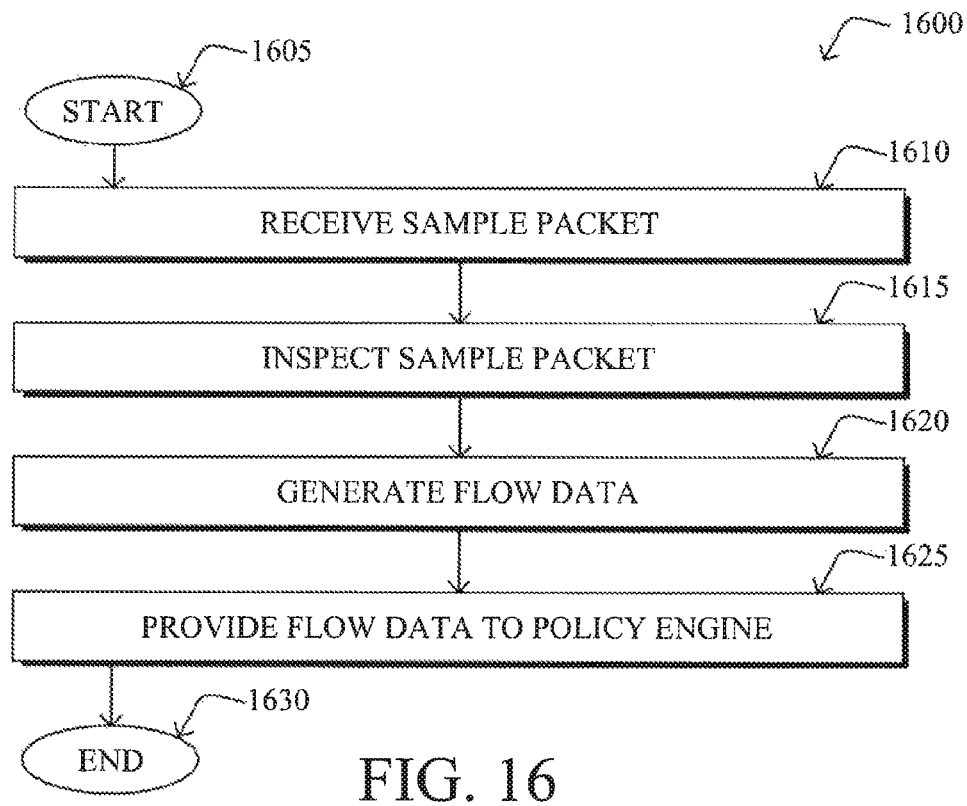
FIG. 16 illustrates an example simplified procedure for inspecting a sample packet of a traffic flow.

FIG. 16 illustrates an example simplified procedure for inspecting a sample packet of a traffic flow in accordance with one or more embodiments described herein. The procedure 1600 may start at step 1605, and continues to step 1610, where, as described in greater detail above, a sample packet of a traffic flow is received. For example, a PCE may receive a sample traffic flow packet that includes a traffic flow signature (e.g., a hash value) within the header of the packet. The signature may be used by the PCE to distinguish the traffic flow from other traffic flows used within the network.

At step 1615, the packet is inspected by the receiving device, as described in greater detail above. For example, a PCE that receives a signed traffic flow sample packet may perform DPI analysis on the packet. In general, DPI analysis involves inspecting the data portion of the packet (e.g., the payload). For example, DPI analysis may be used to detect a virus, protocol non-compliance, etc. Such an analysis may also be used according to the techniques herein to identify a type of traffic flow from the received packet (e.g., the traffic flow contains audio or video data, etc.).

At step 1620, flow data is generated, as described in greater detail above. For example, as shown in FIG. 13A, PCE 902 may generate flow data by inspecting sample packet(s) from a given traffic flow. The flow data may include statistics such as the average duration, application breakout, etc. of the traffic flow. Further information in the flow data may include the signature of the flow, the CoAP method of the flow, or any other information regarding the traffic flow.

At step 1625, the generated flow data is provided to a network policy engine, as detailed above. For example, as shown in FIG. 13A, PCE 902 may provide flow data 1302 to policy engine 904. In response to receiving the flow data, the policy engine may select a traffic flow policy for the flow and instruct one or more nodes in the network to enforce the policy. In various embodiments, the PCE and network policy engine may be co-located or in communication with one another via a network. Procedure 1600 then ends at step 1630.

Figure 17:
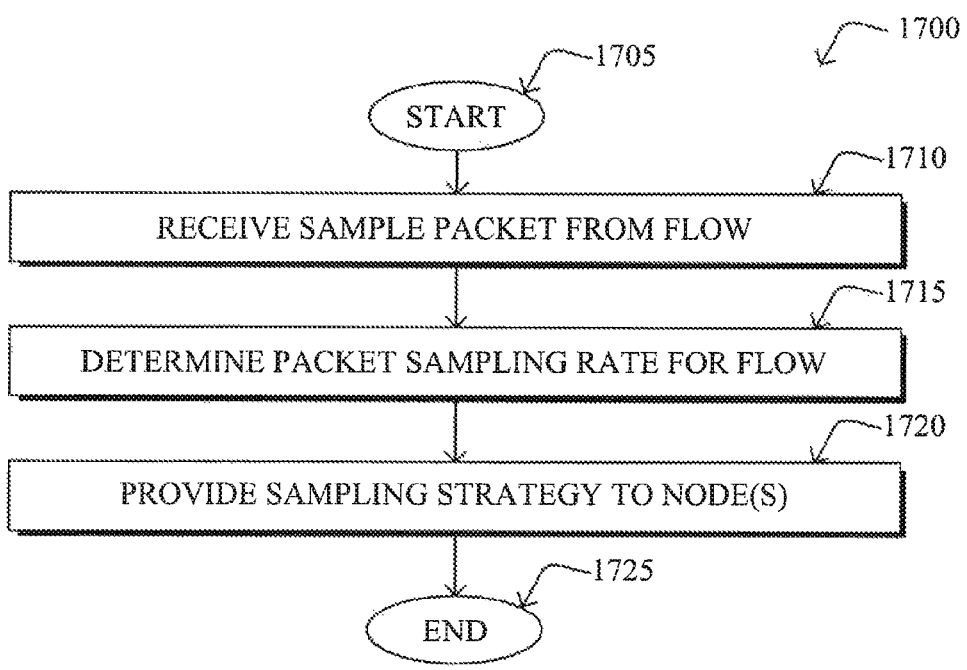
FIG. 17 illustrates an example simplified procedure for adjusting a traffic flow sampling strategy.

FIG. 17 illustrates an example simplified procedure for adjusting a traffic flow sampling strategy in accordance with one or more embodiments described herein. The procedure 1700 may start at step 1705, and continues to step 1710, where, as described in greater detail above, a sample packet from a traffic flow is received. As noted above, the sample packet may include a signature that identifies the flow within the network (e.g., as a hash value of characteristics of the flow). Such a sample may be received by PCE or other centralized networking device configured to oversee network operations.

At step 1715, a packet sampling rate is determined for the traffic flow, as described in greater detail above. In some embodiments, the packet sampling rate may be based on a traffic policy associated with the traffic flow. For example, a PCE may determine a sampling rate used to ensure compliance with the traffic policy. In other embodiments, the sampling rate may take into account network conditions, such as the presence of congestion, available resources, link characteristics, or the like. The sampling rate may also be adjusted dynamically (e.g., in response to detecting a triggering condition) and may, in some cases, be determined by a machine learning model. For example, a machine learning model may predict an optimal sampling rate for traffic flow packets based on the network conditions and other related factors.

At step 1720, a sampling strategy is provided to one or more network nodes, as detailed above. Such a strategy may take into account the sampling rate determined in step 1715. For example, a particular node in the network may be instructed to sample packets from a traffic flow at a certain time, during a certain time frame, at a defined frequency, etc. At the corresponding times, the instructed node may make a copy of a packet from the traffic flow and provide the copy to a centralized networking device, such as a PCE, for further analysis. Procedure 1725 then ends at step 1730.

It should be noted that while certain steps within procedures 1400-1700 may be optional as described above, the steps shown in FIGS. 14-17 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1400-1700 are described separately, certain steps from each procedure may be incorporated into each other procedure, and the procedures are not meant to be mutually exclusive.

The techniques described herein, therefore, provide for a lightweight sampling mechanism that enables the use of QoS operations within a constrained network. In some aspects, the techniques herein allow a PCE and/or policy engine to be used within a constrained network, DPI may also be performed external to the constrained network, thereby limiting the amount of resources consumed within the constrained network itself.

While there have been shown and described illustrative embodiments that provide for the arbitration of time contention in a shared-media communication network, it is to be understood that various other adaptations and modifications may be made within the spirit and scope of the embodiments herein. For example, the embodiments have been shown and described herein primarily with respect to LLNs. However, the embodiments in their broader sense are not as limited, and may, in fact, be used with other types of networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a device in a low power and lossy network (LLN), one or more packets that are part of a traffic flow;
providing, by the device, a sample packet including a packet header to a path computation element (PCE), wherein the sample packet includes a flow signature and flow description computed by one or more nodes in the LLN and inserted into the packet header, wherein the flow signature and flow description are different, the signature uniquely identifying the traffic flow;
receiving, at the device, a traffic flow policy for the traffic flow from a policy engine; and
enforcing, by the device, the traffic flow policy for the traffic flow.

2. The method as in claim 1, further comprising:
identifying, by the device, the traffic flow as a new traffic flow based on the signature.

3. The method as in claim 1, wherein the signature comprises a hash value that uniquely identifies a type and a source of the traffic flow.

4. The method as in claim 1, wherein one or more quality of service (QoS) parameters are included in a header of the sample packet.

5. The method as in claim 1, wherein the traffic flow policy for the traffic flow is enforced by at least one of: imposing a traffic flow rate on the traffic flow, dropping packets of the traffic flow, adjusting a channel hopping schedule used by one or more nodes associated with the traffic flow, or causing the traffic flow to be rerouted.

6. The method as in claim 1, further comprising:
receiving, from the PCE, data indicative of a sample rate for the traffic flow;
and wherein providing the sample packet to the PCE comprises:
sending, by the device, sample packets of the traffic flow to the PCE according to the received sample rate.

7. A method, comprising:
generating, by a device in an LLN, a flow signature for a particular traffic flow;
generating, by the device, a flow description for the traffic flow, wherein the flow signature and flow description are different;
inserting, by the device, the flow signature and description into a header of a packet belonging to the traffic flow; and
sending, by the device, the packet to another device in the LLN for providing to a PCE.

8. The method as in claim 7, wherein the other device is the PCE.

9. The method as in claim 7, wherein the signature comprises a hash value that uniquely identifies a type and a source of the traffic flow.

10. The method as in claim 7, wherein the flow description includes one or more quality of service (QoS) parameters.

11. A method, comprising:
receiving, at a device, a sample packet including a packet header that is part of a traffic flow in an LLN, the sample packet including a flow signature and a flow description computed by one or more nodes in the LLN and inserted into the packet header, wherein the flow signature and flow description are different, the signature uniquely identifying the traffic flow;
inspecting, by the device, the sample packet to identify properties of the traffic flow;
generating, by the device, flow data based on the identified properties of the traffic flow; and
providing, by the device, the flow data to a network traffic policy engine.

12. The method as in claim 11, further comprising:
determining, by the device, a packet sampling rate for the traffic flow; and
providing, by the device, a packet sampling strategy to the one or more network nodes based on the determined sampling rate.

13. The method as in claim 12, wherein the packet sampling rate is determined based on a traffic policy associated with the traffic flow.

14. The method as in claim 12, wherein the packet sampling rate is based on measured traffic congestion in the network.

15. An apparatus, comprising:
one or more network interfaces to communicate with a network;
a processor coupled to the network interfaces and configured to execute one or more processes; and
a memory configured to store a process executable by the processor, the process when executed operable to:
receive one or more packets that are part of a traffic flow in an LLN;
provide a sample packet including a packet header to a path computation element (PCE), wherein the sample packet includes a flow signature and flow description computed by one or more nodes in the LLN and inserted into the packet header, wherein the flow signature and flow description are different, the signature uniquely identifying the traffic flow;
receive a traffic flow policy for the traffic flow from a policy engine; and
enforce the traffic flow policy for the traffic flow.

16. The apparatus as in claim 15, wherein the process when executed is further operable to:
identify the traffic flow as a new traffic flow based on the signature.

17. The apparatus as in claim 15, wherein the signature comprises a hash value that uniquely identifies a type and a source of the traffic flow.

18. The apparatus as in claim 15, wherein one or more quality of service (QoS) parameters are included in a header of the sample packet.

19. The apparatus as in claim 15, wherein the traffic flow policy for the traffic flow is enforced by at least one of: imposing a traffic flow rate on the traffic flow, dropping packets of the traffic flow, adjusting a channel hopping schedule used by one or more nodes associated with the traffic flow, or causing the traffic flow to be rerouted.

20. The apparatus as in claim 15, wherein the process when executed is further operable to:
receive, from the PCE, data indicative of a sample rate for the traffic flow; and
send sample packets of the traffic flow to the PCE according to the received sample rate.

21. An apparatus, comprising:
one or more network interfaces to communicate with a network;

a processor coupled to the network interfaces and configured to execute one or more processes; and a memory configured to store a process executable by the processor, the process when executed operable to:

generate a flow signature for a particular traffic flow in an LLN;

generate a flow description for the traffic flow, wherein the flow signature and flow description are different;

insert the flow signature and description into a header of a packet belonging to the traffic flow; and send the packet to another device in the LLN for providing to a PCE.

22. The apparatus as in claim 21, wherein the other device is the PCE.

23. The apparatus as in claim 21, wherein the flow signature comprises a hash value that uniquely identifies a type and a source of the traffic flow.

24. The apparatus as in claim 21, wherein the flow description includes one or more quality of service (QoS) parameters.

25. An apparatus, comprising:

one or more network interfaces to communicate with a network;

a processor coupled to the network interfaces and configured to execute one or more processes; and a memory configured to store a process executable by the processor, the process when executed operable to:

receive a sample packet including a packet header that is part of a traffic flow in an LLN, the sample packet including a flow signature and a flow description computed by one or more nodes in the LLN and inserted into the packet header, wherein the flow signature and flow description are different, the signature uniquely identifying the traffic flow;

inspect the sample packet to identify properties of the traffic flow;

generate flow data based on the identified properties of the traffic flow; and provide the flow data to a network traffic policy engine.

26. The apparatus as in claim 25, wherein the process when executed is further operable to:

determine a packet sampling rate for the traffic flow; and provide a packet sampling strategy to the one or more network nodes based on the determined sampling rate.

27. The apparatus as in claim 26, wherein the packet sampling rate is determined based on a traffic policy associated with the traffic flow.

28. The apparatus as in claim 26, wherein the packet sampling rate is based on measured traffic congestion in the network.

* * * * *